US012720379B2

(12) United States Patent
Thangarasa et al.

(10) Patent No.: US 12,720,379 B2
(45) Date of Patent: Aug. 25, 2026

(54) SYSTEMS AND METHODS FOR PERFORMING CELL CHANGE TO A TARGET CELL SUBJECT TO CLEAR CHANNEL ASSESSMENT

(71) Applicant: Telefonaktiebolaget LM Ericsson (publ), Stockholm (SE)

(72) Inventors: Santhan Thangarasa, Vällingby (SE); Muhammad Ali Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 665 days.

(21) Appl. No.: 17/610,776

(22) PCT Filed: May 11, 2020

(86) PCT No.: PCT/EP2020/062970
§ 371 (c)(1),
(2) Date: Nov. 12, 2021

(87) PCT Pub. No.: WO2020/229380
PCT Pub. Date: Nov. 19, 2020

(65) Prior Publication Data

US 2022/0070743 A1 Mar. 3, 2022

Related U.S. Application Data

(60) Provisional application No. 62/847,745, filed on May 14, 2019.

(51) Int. Cl.
*H04W 36/00* (2009.01)
*H04W 74/0808* (2024.01)

(52) U.S. Cl.
CPC ... *H04W 36/0079* (2018.08); *H04W 36/0022* (2013.01); *H04W 74/0808* (2013.01)

(58) Field of Classification Search
CPC ......... H04W 36/0079; H04W 36/0022; H04W 74/0808
See application file for complete search history.

(56) References Cited

U.S. PATENT DOCUMENTS

2017/0006558 A1* 1/2017 Zhan .................. H04W 52/362
2021/0289548 A1* 9/2021 Murray .............. H04W 74/006
(Continued)

OTHER PUBLICATIONS

Author Unknown, "Technical Specification Group Core Network and Terminals; Non-Access-Stratum (NAS) functions related to Mobile Station (MS) in idle mode (Release 16)," Technical Specification 23.122, Version 16.1.0, 3GPP Organizational Partners, Mar. 2019, 66 pages.
(Continued)

*Primary Examiner* — Michael Thier
*Assistant Examiner* — Nevena Zecevic Sandhu
(74) *Attorney, Agent, or Firm* — Sage Patent Group

(57) ABSTRACT

Systems and methods are disclosed herein that relate to performing a cell change to a target cell that is subject to Clear Channel Assessment (CCA). In one embodiment, a method performed by a wireless device for cell change to a cell that is subject to CCA comprises obtaining one or more cell change configurations that are related to CCA failures when performing a cell change to a target cell subject to CCA and performing a cell change to a desired target cell subject to CCA. Performing the cell change comprises performing the cell change based on the one or more cell change configurations. Corresponding embodiments of a wireless device are also disclosed. Embodiments of a method performed by a network node and corresponding embodiments of a network node are also disclosed.

14 Claims, 9 Drawing Sheets

(56) References Cited

U.S. PATENT DOCUMENTS

2022/0141737 A1* 5/2022 Wang .................. H04W 36/305 370/331
2022/0322175 A1* 10/2022 Liu ..................... H04W 36/085

OTHER PUBLICATIONS

Author Unknown, "Technical Specification Group Radio Access Network; Evolved Universal Terrestrial Radio Access (E-UTRA); User Equipment (UE) radio transmission and reception (Release 16)," Technical Specification 36.101, Version 16.1.0, 3GPP Organizational Partners, Mar. 2019, 1843 pages.
Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.5.0, 3GPP Organizational Partners, Mar. 2019, 363 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.5.1, 3GPP Organizational Partners, Apr. 2019, 948 pages.
Author Unknown, "Technical Specification Group Radio Access Network; NR; Multiplexing and channel coding (Release 15)," Technical Specification 38.212, Version 15.5.0, 3GPP Organizational Partners, Mar. 2019, 101 pages.
Author Unknown, "Technical Specification Group Radio Access Network; NR; Physical layer procedures for control (Release 15)," Technical Specification 38.213, Version 15.5.0, 3GPP Organizational Partners, Mar. 2019, 104 pages.
Author Unknown, "Technical Specification Group Radio Access Network; NR; User Equipment (UE) procedures in Idle mode and RRC Inactive state (Release 15)," Technical Specification 38.304, Version 15.3.0, 3GPP Organizational Partners, Mar. 2019, 29 pages.
Author Unknown, "Technical Specification Group Radio Access Network; NR; Radio Resource Control (RRC) protocol specification (Release 15)," Technical Specification 38.331, Version 15.5.1, 3GPP Organizational Partners, Apr. 2019, 491 pages.
Ericsson, et al., "R4-1910551: WF on RRM Requirements for NR-U," Third Generation Partnership Project (3GPP), TSG-RAN WG4 Meeting #92, Aug. 26-30, 2019, 34 pages, Ljubljana, Slovenia.
Ericsson, et al., "R4-1912846: WG on RRM Requirements for NR-U (all agreements in RAN4#92-bis," Third Generation Partnership Project (3GPP), TSG-RAN WG4 Meeting #92-bis, Oct. 14-18, 2019, 37 pages, Chongqing, P.R. of China.
Ericsson, "R4-1914721: Remaining discussions on IDLE mode cell re-selection requirements for NR-U standalone," Third Generation Partnership Project (3GPP), TSG-RAN WG4 Meeting #93, Oct. 18-22, 2019, 3 pages, Reno, USA.
Ericsson, et al., "R4-1915777: WF on NR-U RRM Requirements (all agreements in RAN4#93)," Third Generation Partnership Project (3GPP), TSG-RAN WG4 Meeting #93, Nov. 18-22, 2019, 39 pages, Reno, Nevada.
Huawei, et al., "R2-1904114: Email discussion report on [105#49][NR] LBT impacts in MAC," Third Generation Partnership Project (3GPP), TSG RAN WG2 Meeting #105bis, Apr. 8-12, 2019, 55 pages, Xi'an, China.
MediaTek Inc., "R2-1901094: Detecting and handling systematic LBT failures in MAC," Third Generation Partnership Project (3GPP), TSG-RAN WG2 Meeting #105, Feb. 25-Mar. 1, 2019, 4 pages, Athens, Greece.
Spreadtrum Communications, "R2-1903785: Consideration of LBT failures in Non-connected state," Third Generation Partnership Project (3GPP), TSG-RAN WG2 Meeting #105bis, Apr. 8-12, 2019, 2 pages, Xi'an, China.
Xiaomi Communications, "R2-1905729: Consideration on extending RAR window size," Third Generation Partnership Project (3GPP), TSG-RAN2 #106, May 13-17, 2019, 2 pages, Reno, USA.
ZTE corporation, et al., "R2-1906317: Extending SI-window for NR-U," Third Generation Partnership Project (3GPP), TSG-RAN WG2 Meeting #106, May 13-17, 2019, 2 pages, Reno, USA.
International Search Report and Written Opinion for International Patent Application No. PCT/EP2020/062970, mailed Sep. 18, 2020, 23 pages.
Panigrahi, Prashant; "3GPP—LTE CS Fallback (CSFB) Call Flow Procedure"; 3GLTEinfo; published Nov. 3, 2016; 10 pages.
Hearing Notice mailed Oct. 16, 2025 for Indian Patent Application No. 202147057498, 3 pages.

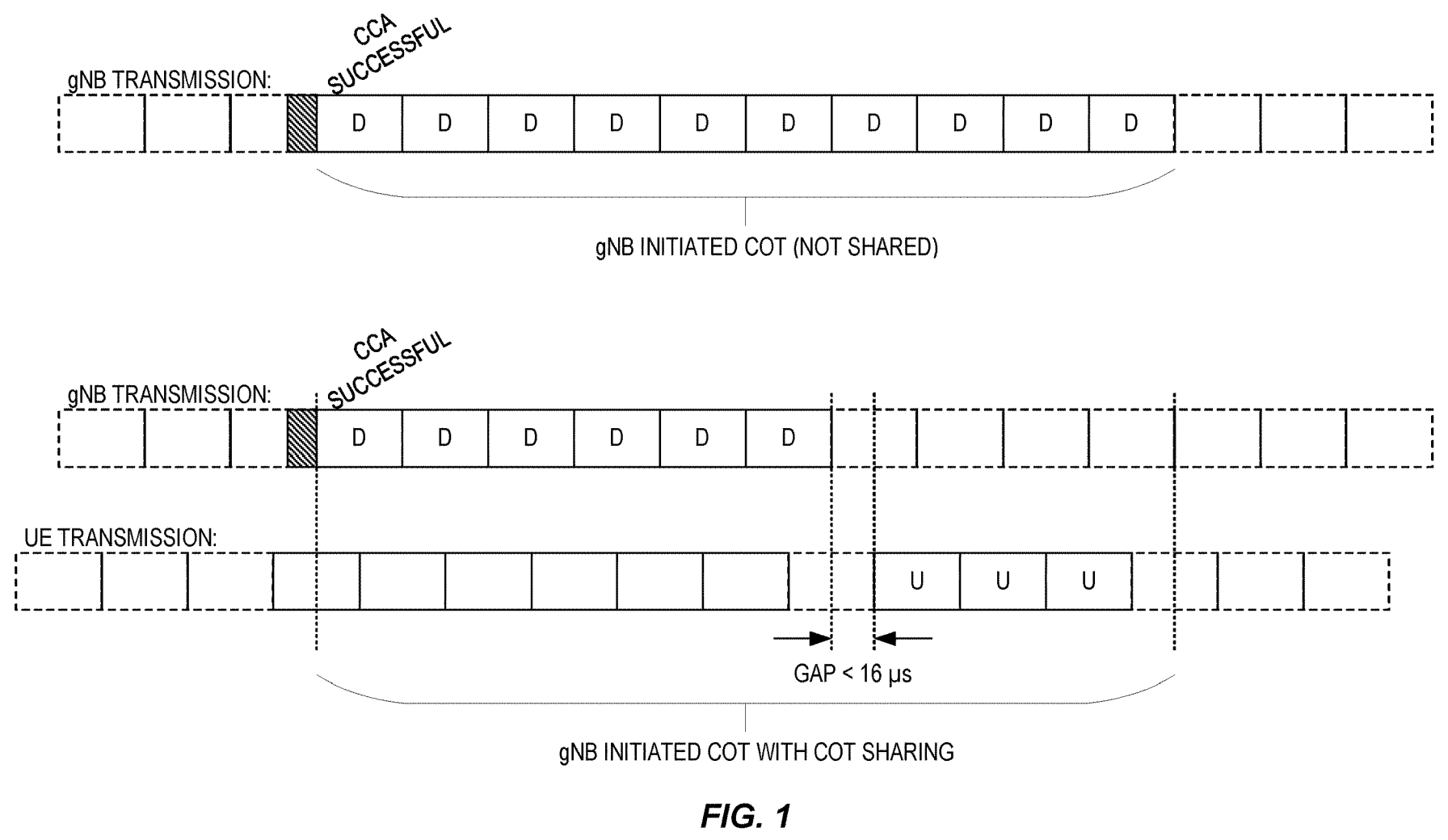

* cited by examiner gNB TRANSMISSION:
CCA SUCCESSFUL
D D D D D D D D D D
gNB INITIATED COT (NOT SHARED)

gNB TRANSMISSION:
CCA SUCCESSFUL
D D D D D D
UE TRANSMISSION:
U U U
GAP < 16 µs
gNB INITIATED COT WITH COT SHARING

FIG. 1

SYSTEMS AND METHODS FOR PERFORMING CELL CHANGE TO A TARGET CELL SUBJECT TO CLEAR CHANNEL ASSESSMENT

RELATED APPLICATIONS

This application is a 35 U.S.C. § 371 national phase filing of International Application No. PCT/EP2020/062970, filed May 11, 2020, which claims the benefit of provisional patent application Ser. No. 62/847,745, filed May 14, 2019, the disclosures of which are hereby incorporated herein by reference in their entireties.

TECHNICAL FIELD

The present disclosure relates to a cellular communications system and, in particular, to cell change in a cellular communications system.

BACKGROUND

Third Generation Partnership Project (3GPP) New Radio (NR) operation in unlicensed spectrum is being standardized in 3GPP Release 16. NR operation in unlicensed spectrum is denoted as NR-U.

Operation in unlicensed spectrum is inherently different from operation in licensed spectrum. The unlicensed spectrum may be shared by multiple networks, including networks operating according to different standards, e.g. Long Term Evolution (LTE) License Assisted Access (LAA) (denoted as LTE-LAA) or Wi-Fi. Although a guiding principle in the NR specification work is to reuse as much as possible from regular NR (i.e. NR operating in licensed spectrum), NR-U will have to conform to the regulatory requirements of operation in unlicensed spectrum. This includes the so-called Listen-Before-Talk (LBT) principle, where a device/node must perform a Clear Channel Assessment (CCA) with positive outcome (no detected transmission in the radio channel/spectrum it intends to transmit in) before it may initiate a transmission.

A CCA consists of monitoring the channel for a certain specified time and measuring the received energy (and/or, in Wi-Fi, checking for preamble transmission indicating the beginning of another device's transmission). To allow a transmission from a device, the received energy must be below a certain threshold (and/or no Wi-Fi preamble must be detected/received above a certain threshold) for the channel to be assessed as clear. The example of energy detection level threshold is −72 dBm, above which the channel is considered busy and the device/node (i.e., User Equipment (UE) or Base Station (BS)) is required to defer transmission.

After sensing the channel to be idle, the device/node is typically allowed to transmit for a certain amount of time, sometimes referred to as the Channel Occupancy Time (COT) or Maximum Channel Occupancy Time (MCOT). The maximum allowed length of the COT depends on regulation and type of CCA (e.g. for how long time the medium was sensed) that has been performed, but typically ranges from 1 millisecond (ms) to 10 ms.

Gaps up to 16 microseconds (μs) are allowed in the transmission without performing an additional CCA. The CCA-free 16 μs gap was introduced to accommodate the turn-around time from reception of a transmission to acknowledgement of the transmission in Wi-Fi. It is anticipated that, for NR-U, a similar gap to accommodate for the radio turnaround time is expected to be allowed. This will enable the transmission of Physical Uplink Control Channel (PUCCH) carrying Uplink Control Information (UCI) feedback as well as Physical Uplink Shared Channel (PUSCH) carrying data and possibly UCI without the CCA before the PUSCH/PUCCH transmission if the gap between downlink (DL) and uplink (UL) transmission is less than or equal to 16 μs. Another option in case the gap is larger than 16 μs is for the UE to perform a short 25 μs CCA. Operation in this manner is typically called "COT sharing".

FIG. 1 illustrates a transmission opportunity both with and without COT sharing after a successful CCA at initiating node, which in this example is the NR base station (gNB). For the case of COT sharing, the gap between DL and UL transmission is less than 16 μs.

The CCA/LBT mechanism, and other properties that are specific to operation in unlicensed spectrum, forces NR-U to deviate from regular NR and adapt the functionality. For instance, the network can configure or allocate time windows instead of single occasions or a surplus of transmission occasions to compensate for potential CCA failures, i.e., to increase the chances of transmission success despite potential CCA failures. Examples of when this may be used include system information (SI) transmissions, paging transmissions, PUCCH transmissions, etc. Other ways of adapting to operation in unlicensed spectrum include, e.g., behavioral adaptations to accommodate the risk that a reference signal or data transmission expected to be received is absent and that this may be due to CCA failure rather than a poor channel quality or lost radio link.

Another consequence of operation in unlicensed spectrum is that networks operated by different operators may share the same spectrum in the same location. The unlicensed spectrum may be divided into parts or subbands (denoted parts/subbands), sometimes referred to as channels, typically consisting of 20 Megahertz (MHz) each. The parts/subbands may mitigate problems caused by the spectrum sharing in the unlicensed spectrum. A network can selectively choose to operate in only one or more of such spectrum parts/channels. In NR-U, such spectrum parts/channels may be referred to as Bandwidth Parts (BWPs), reusing the term and concept from regular NR where a BWP is a part of the full carrier bandwidth, which can be allocated to UEs in RRC_CONNECTED and/or RRC_INACTIVE and RRC_IDLE state. A network may mitigate the problem of spectrum sharing by favoring operation in less loaded channels, i.e., channels for which the channel occupancy is low.

As described above, LBT is designed for unlicensed spectrum co-existence with other Radio Access Technologies (RATs) and other users of the system and the medium. In this mechanism, a radio device applies a CCA check before any transmission. The transmitter involves energy detection (ED) over a time period compared to a certain threshold (ED threshold) to determine if a channel is idle. Another CCA mechanism is to detect a known preamble. In case the channel is determined to be occupied, the transmitter performs a random back-off within a contention window before next CCA attempt.

To protect ACK transmissions, the transmitter must defer a period after each busy CCA slot prior to resuming back-off. As soon as the transmitter has grasped the channel, the transmitter is only allowed to perform transmission up to a maximum time duration called the MCOT. For Quality of Service (QoS) differentiation, a channel access priority scheme based on the service type has been defined. For example, in LTE-LAA, four CCA/LBT Channel Access Priority Classes (CAPCs) are defined for differentiation of contention window sizes (CWSs) and MCOTs between services. In LTE-LAA, the following mapping between CAPC and QoS Class Identifiers (QCIs) is defined in 3GPP Technical Specification (TS) 36.300:

| Channel Access Priority Class (p) | QCI |
|---|---|
| 1 | 1, 3, 5, 65, 66, 69, 70 |
| 2 | 2, 7 |
| 3 | 4, 6, 8, 9 |
| 4 | — |

Therefore, when scheduling UL or DL traffic in LTE-LAA, the enhanced or evolved Node B (eNB) should consider the QCI of the traffic to be transmitted. For uplink, the CAPC that the UE needs to use for a given UL transmission is either signaled in the UL grant on the PDCCH for dynamic scheduling or indicated as part of a logical channel configuration for autonomous LTE-LAA UL transmissions. In the latter case, the UE applies the CAPC indicated in the logical channel configuration when autonomously transmitting data from that logical channel. In case there are multiple Medium Access Control (MAC) Service Data Units (SDUs) multiplexed in the same MAC Protocol Data Unit (PDU) and associated with different logical channels, the UE applies the QCI associated with the lowest CAPC of all the logical channels included in the MAC PDU.

The channel access schemes for NR-based access for unlicensed spectrum can be classified into the following categories:

- Category 1: Immediate transmission after a switching gap no longer than 16 µs. This is used for a transmitter to immediately transmit after a UL/DL switching gap inside a COT. The reason for the switching gap from reception to transmission is to accommodate the transceiver turnaround time.
- Category 2: CCA/LBT without random back-off. The duration of time that the channel is sensed to be idle before the transmitting entity transmits is deterministic.
- Category 3: CCA/LBT with random back-off with a contention window of fixed size. The CCA/LBT procedure has the following procedure as one of its components. The transmitting entity draws a random number N within a contention window. The size of the contention window is specified by the minimum and maximum value of N. The size of the contention window is fixed. The random number N is used in the CCA/LBT procedure to determine the duration of time that the channel is sensed to be idle before the transmitting entity transmits on the channel.
- Category 4: CCA/LBT with random back-off with a contention window of variable size. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the CCA/LBT procedure to determine the duration of time that the channel is sensed to be idle before the transmitting entity transmits on the channel.

It has been suggested that consistent or too frequent CCA failures should trigger Radio Link Failure (RLF). RLF declaration and subsequent radio link reestablishment are UE autonomous procedures. As such, UL CCA failures are easily incorporated, since these are experienced directly by the UE.

However, DL CCA failures can only be indirectly detected by a UE, e.g. due to lack of reception, or possibly a delay of the reception, of a Discovery Reference Signal (DRS) in accordance with the repetitive schedule of the DRS in the cell. In addition, it is inherently difficult for a UE to distinguish between cases where the lack of reception of a DRS is due to CCA failure(s) at the gNB or due to a bad DL radio channel. A solution where the UE makes this distinction based on the amount of detected energy or power level has been suggested and specified for LTE-LAA.

The DRS in NR comprises Synchronization Signal and Physical Broadcast Channel (PBCH) Block (SSB) and more specifically consists of the following signals:

- Primary Synchronization Signal (PSS),
- Secondary Synchronization Signal (SSS),
- Physical Broadcast Channel (PBCH), and
- Demodulation Reference Symbols (DM-RS).

The SSB is also referred to, "SS/PBCH block". The SSB comprises of four consecutive Orthogonal Frequency Division Multiplexing (OFDM) symbols in time domain and 240 consecutive subcarriers in frequency domain. Since each Resource Block (RB) comprises 12 subcarriers, the SSB comprises 20 RBs regardless of the SSB subcarrier spacing (SCS). The bandwidth however depends on the SCS of the SSB e.g. 3.6 MHz, 7.2 MHz, 28.8 MHz, and 57.6 MHz for SCS of 15 kHz, 30 kHz, 120 kHz, and 240 kHz respectively. Multiple SSBs can be transmitted within a half-frame (5 ms) in an NR cell, denoted as an SSB burst. The maximum number of SSBs and their locations in the SSB burst depends on the frequency range, as well as on the SSB numerology (e.g. SCS). The SSB burst (hence the individual SSBs) are transmitted according to SS/PBCH block measurement timing configuration (SMTC) cycle, which may be 5, 10, 20, 40, 80 or 160 ms. The SMTC cycle is also interchangeably referred to as SMTC period or SMTC periodicity. The default periodicity is 20 ms, which is assumed by the UE during the initial cell search procedure. During each SMTC cycle or SMTC period, one or more SSBs are transmitted during a time window referred to as SMTC window. The maximum SMTC window duration is 5 ms, but the actual window depends on several factors e.g. SCS of SSB, number of SSBs (which correspond to number of beams) within the SMTC window, etc. The SMTC window duration can be e.g. 1 ms, 2 ms, 3 ms, 4 ms or 5 ms.

The signals in the SSB are used by the UE for performing one or more operations. Examples of such operations are:

- time and/or frequency synchronization,
- radio link monitoring (e.g. out of sync (OOS) evaluation, in-sync (IS) evaluation etc.),
- cell search,
- measurements (e.g. SS-RSRP, SS-RSRQ, SS-SINR etc.),
- channel estimation, etc.

Regarding cell search, in the Frequency Division Duplexing (FDD) configuration of LTE, DL subframe #0 and subframe #5 carry synchronization signals (i.e. both PSS and SSS). In Time Division Duplexing (TDD) configurations, the two pairs of synchronization signals per radio frame are carried by subframes 0 and 1, and 5 and 6, respectively. For the ease of presentation, only the FDD configuration is discussed here. There are however no significant differences regarding cell search in FDD and TDD systems; hence, the description can easily be adapted to TDD scenarios.

In order to identify an unknown cell (e.g. new neighbor cell), the UE has to acquire the timing of that cell and eventually the Physical Cell ID (PCI). Subsequently, the UE also measures Reference Symbol Received Power (RSRP) and/or Reference Symbol Received Quality (RSRQ) of the newly identified cell in order to use by itself (in case of UE-controlled mobility in idle mode) and/or report the measurement to the network node. In total there are 504 PCIs.

Therefore, the UE searches or identifies a cell (i.e. acquires PCI of the cell) by correlating the received PSS/SSS signals in DL subframe #0 and/or in DL subframe #5 with one or more of the pre-defined PSS/SSS sequences. The use of subframe #0 and/or in DL subframe #5 for PCI acquisition depends upon the UE implementation. The UE regularly attempts to identify neighbor cells on at least the serving carrier frequency(ies). But the UE may also search cells on non-serving carrier(s) when configured by the network node to do so. In order to minimize UE power consumption, typically the UE searches in one of the DL subframes that carries synchronization signals, i.e., #0 or #5. In order to further save its battery power, the UE searches for newly detectable neighbor cells on the intra-frequency carrier once every 40 ms in non-Discontinuous Reception (DRX) or in short DRX cycle (e.g. up to 40 ms). In longer DRX cycle, the UE typically searches for newly detectable neighbor cells once every DRX cycle. During each search attempt, the UE typically stores a snapshot of radio samples of 5-6 ms and post processes those samples by correlating the stored signals with the known PSS/SSS sequences. The reason for acquiring 5-6 ms of radio samples is that, in case the neighbor cell(s) are not synchronous to the serving cell, the UE does not know where exactly to find the synchronization signal, but knows that there will be one such signal transmitted every 5 ms. In non-DRX, the UE is able to identify an intra-frequency cell (including RSRP/RSRQ measurements) within 800 ms (i.e. 20 attempts in total including 15 and 5 samples, respectively, for cell identification (PCI acquisition) and RSRP/RSRQ measurement).

Radio measurements done by the UE are typically performed on the serving as well as on neighbor cells over some known reference symbols or pilot sequences. The measurements are done on cells on an intra-frequency carrier, inter-frequency carrier(s) as well as on inter-RAT carriers(s) (depending upon the UE capability whether it supports that RAT). To enable inter-frequency and inter-RAT measurements for the UE requiring gaps, the network has to configure the measurement gaps.

The measurements are done for various purposes. Some example measurement purposes are: mobility, positioning, self-organizing network (SON), minimization of drive tests (MDT), operation and maintenance (O&M), network planning and optimization etc. Examples of measurements in LTE are Cell identification aka PCI acquisition, Reference Symbol Received Power (RSRP), Reference Symbol Received Quality (RSRQ), NRSRP, NRSRQ, S-RSRP, RS-SINR, CSI-RSRP, acquisition of system information (SI), cell global ID (CGI) acquisition, Reference Signal Time Difference (RSTD), UE RX-TX time difference measurement, Radio Link Monitoring (RLM) which consists of Out of Synchronization (out of sync) detection and In Synchronization (in-sync) detection, etc. Channel State Information (CSI) measurements performed by the UE are used for scheduling, link adaptation etc. by network. Examples of CSI measurements or CSI reports are Channel Quality Indicator (CQI), Precoding Matrix Indicator (PMI), Rank Indicator (RI), etc. They may be performed on reference signals like CRS, CSI-RS, or DMRS.

The measurements may be unidirectional (e.g., DL or UL) or bidirectional (e.g., having UL and DL components such as Rx-Tx, RTT, etc.).

The DL subframe #0 and subframe #5 carry synchronization signals (i.e. both PSS and SSS). In order to identify an unknown cell (e.g. new neighbor cell), the UE has to acquire the timing of that cell and eventually the physical cell ID (PCI). This is called as cell search or cell identification or even cell detection. Subsequently the UE also measures RSRP and/or RSRQ of the newly identified cell in order to use itself and/or report the measurement to the network node. In total there are 504 PCIs. The cell search is also a type of measurement.

The measurements are done in all RRC states, i.e. in RRC idle and RRC connected states.

There currently exist certain challenge(s). The UE may fail to receive expected periodic reference signal DRS (e.g. SSB etc.) due to CCA failure, and the UE does not know whether lack of detection and/or reception was due to CCA or lack of presence of such signals. The mobility procedure in IDLE state (or INACTIVITY state) is based on UE detecting candidate cells and signal strength and/or quality of the measurements performed on them.

The UE may perform following type of cell changes: (1) from a cell on licensed band to a cell on licensed band, (2) from a cell on licensed band to a cell on unlicensed band, (3) from a cell on unlicensed band to a cell on licensed band, or (4) from a cell on unlicensed band to a cell on unlicensed band.

The problem arises when a UE is performing a cell change from a cell (cell1) on a licensed or unlicensed band to a cell (cell2) on unlicensed cell band (scenarios #2 and #4 above), where due to CCA failure the UE may fail to carry out cell identification and/or cell measurements and/or acquisition of system information on cell2 when the target cell (cell2) belongs to the unlicensed band. Typically, the UE evaluates the serving cell based on Radio Resource Monitoring (RRM) measurements and also identifies potential candidate (neighbor) cells and performs measurements on them for potential cell change. The cell change is typically triggered as a result of cell suitability evaluation. For example, signal strength and/or quality of cell2 can be rather strong when cell suitability criteria was evaluated but due to CCA failure cell2 may fail to transmit necessary signals (e.g. reference signals, system information, etc.) later in time when the UE is actually performing the cell change to cell2. This can result in the UE failing to complete the cell change procedure towards cell2 even though cell2 might have met the cell change criteria. As a result, the UE ends up with connection failure. The UE may have to initiate the lengthy initial access procedure.

SUMMARY

Systems and methods are disclosed herein that relate to performing a cell change to a target cell that is subject to Clear Channel Assessment (CCA). In one embodiment, a method performed by a wireless device for cell change to a cell that is subject to CCA comprises obtaining one or more cell change configurations that are related to CCA failures when performing a cell change to a target cell subject to CCA and performing a cell change to a desired target cell subject to CCA. Performing the cell change comprises performing the cell change based on the one or more cell change configurations.

In one embodiment, the one or more cell change configurations comprise either or both of: (a) one or more preventative parameters related to prevention of failure of a cell change to a target cell subject to CCA and (b) one or more fallback parameters related to one or more fallback procedures to be performed by the wireless device in event of failure of a cell change to a target cell subject to CCA.

In one embodiment, the one or more cell change configurations comprise information about a set of fallback target cells for a fallback procedure in case the wireless device does not successfully perform a cell change to a target cell subject to CCA. In one embodiment, the set of fallback target cells is a plurality of target cells.

In one embodiment, the one or more cell change configurations comprise information that defines that the wireless device is allowed to attempt cell change a number (N) of times. In another embodiment, the one or more cell change configurations further comprise information that defines that the wireless device is allowed to attempt cell change a number (N) of times over a duration (T).

In one embodiment, the one or more cell change configurations comprise a defined number of cell change attempts. In another embodiment, the one or more cell change configurations comprise a maximum number of cell change attempts allowed to be performed by the wireless device before a failure of the cell change is declared by the wireless device. In one embodiment, the one or more cell change configurations comprise a maximum duration of time for cell change attempts.

In one embodiment, the one or more cell change configurations comprise a maximum duration of time that the cell change can be attempted without success before a failure of the cell change is declared by the wireless device.

In one embodiment, the one or more cell change configurations comprise one or more cell change configurations for each of two or more stages of the cell change.

In one embodiment, for at least one stage of two or more stages of the cell change, the one or more cell change configurations comprise a maximum number of allowed missed occasions containing a particular signal type(s) in the stage due to CCA failure after which the wireless device declares a failure at the stage of the cell change.

In one embodiment, for at least one stage of two or more stages of the cell change, the one or more cell change configurations comprise a maximum duration of time during the stage over which the wireless device is permitted to miss occasions containing a particular signal type(s) due to CCA failure after which the wireless device declares a failure at the stage of the cell change.

In one embodiment, for at least one stage of two or more stages of the cell change, the one or more cell change configurations comprise a maximum duration of time during the stage after which the wireless device declares a failure at the stage of the cell change provided that during this maximum duration of time the wireless device has missed at least a certain number of occasions containing a particular signal type(s) due to CCA failure.

In one embodiment, the cell change is a cell reselection that comprises a system information acquisition stage during which the UE attempts to obtain system information of a target cell, and the one or more cell change configurations comprises one or more parameters that prolong a duration of time over which the UE is allowed to attempt to obtain system information of a target cell during the system information acquisition stage of the cell reselection.

In one embodiment, the cell change is a cell reselection that comprises a cell update stage during which the UE attempts a random access to a target cell, and the one or more cell change configurations comprises one or more parameters that prolong a duration of time over which the UE is allowed to attempt random access to a target cell during the cell update stage of the cell reselection.

In one embodiment, the one or more cell change configurations comprise one or more signal margins to be used by the wireless device for performing cell change to another cell after failing to perform cell change to a target cell.

In one embodiment, the one or more cell change configurations comprise one or more operating parameters for enabling operation on a new cell after performing cell change to the new cell.

In one embodiment, the one or more cell change configurations comprise one or more configurations related to a fallback procedure in which the UE is allowed to enter a relaxed operational mode to access a fallback cell with a relaxed cell change margin.

In one embodiment, the one or more cell change configurations comprise one or more configurations related to a fallback procedure in which the UE is allowed to relax one or more measurement requirements after cell change to a fallback cell.

In one embodiment, performing the cell change based on the one or more cell change configurations comprises adapting one or more measurement procedures based on the one or more cell change configurations.

In one embodiment, the cell change is a cell reselection, a Radio Resource Control (RRC) connection release with redirection, a RRC re-establishment, or a RRC resume.

In one embodiment, the cell subject to CCA comprises a cell that operates on or belongs to one or more of: a carrier subject to CCA, shared spectrum, spectrum subject to a CCA procedure, spectrum subject to a listen before talk (LBT), and spectrum for contention based operation.

Corresponding embodiments of a wireless device are also disclosed. In one embodiment, a wireless device for cell change to a cell subject to CCA is adapted to obtain one or more cell change configurations that are related to CCA failures when performing a cell change to a target cell subject to CCA and perform a cell change to a desired target cell subject to CCA, wherein performing the cell change comprises performing the cell change based on the one or more cell change configurations.

In one embodiment, a wireless device for cell change to a cell subject to CCA comprises one or more transmitters, one or more receivers, and processing circuitry associated with the one or more transmitters and the one or more receivers. The processing circuitry is configured to cause the wireless device to obtain one or more cell change configurations that are related to CCA failures when performing a cell change to a target cell subject to CCA and perform a cell change to a desired target cell subject to CCA, wherein performing the cell change comprises performing the cell change based on the one or more cell change configurations.

Embodiments of a method performed by a network node for a cellular communications network are also disclosed. In one embodiment, a method performed by a network node for a cellular communications network comprises determining one or more cell change configurations that are related to CCA failures when one or more wireless devices are performing a cell change to a target cell subject to CCA and providing the one or more cell change configurations to a wireless device.

In one embodiment, the one or more cell change configurations comprising either or both of: (a) one or more preventative parameters related to prevention of failure of a cell change to a target cell subject to CCA and (b) one or more fallback parameters related to one or more fallback procedures to be performed by the wireless device in event of failure of a cell change to a target cell subject to CCA.

In one embodiment, the one or more cell change configurations comprise a defined number of cell change attempts.

In one embodiment, the one or more cell change configurations comprise a maximum number of cell change attempts allowed to be performed by the wireless device before a failure of the cell change is declared by the wireless device.

In one embodiment, the one or more cell change configurations comprise a maximum duration of time for cell change attempts.

In one embodiment, the one or more cell change configurations comprise a maximum duration of time that the cell change can be attempted without success before a failure of the cell change is declared by the wireless device.

In one embodiment, the one or more cell change configurations comprise one or more configurations related to one or more fallback procedures to be performed by the wireless device in event of failure of a cell change to a target cell subject to CCA.

In one embodiment, one or more cell change configurations comprise one or more cell change configurations for each of two or more stages of the cell change.

In one embodiment, for at least one stage of two or more stages of the cell change, the one or more cell change configurations comprise any one of, any combination of, or all of the following parameters: a maximum number of allowed missed occasions containing a particular signal type(s) in the stage due to CCA failure after which the wireless device declares a failure at the stage of the cell change, a maximum duration of time during the stage over which the wireless device may miss occasions containing a particular signal type(s) due to CCA failure after which the wireless device declares a failure at the stage of the cell change, and a maximum duration of time during the stage after which the wireless device declares a failure at the stage of the cell change provided that during this maximum duration of time the wireless device has missed at least a certain number of occasions containing a particular signal type(s) due to CCA failure.

In one embodiment, the one or more cell change configurations comprise any one of, any combination of, or all of the following: information about a set of fallback target cells in case the wireless device is unable to successfully perform cell change to a desired target cell, one or more signal margins to be used by the wireless device for performing cell change to another cell after failing to perform cell change to a desired target cell, and one or more operating parameters for enabling operation on a new cell after performing cell change to the new cell.

In one embodiment, the one or more cell change configurations comprise one or more configurations related to a fallback procedure in which the UE is allowed to enter a relaxed operational mode to access a fallback cell with a relaxed cell change margin.

In one embodiment, the cell subject to CCA comprises a cell that operates on or belongs to one or more of: a carrier subject to CCA, shared spectrum, spectrum subject to a CCA procedure, spectrum subject to a LBT, and spectrum for contention based operation.

Corresponding embodiments of a network node are also disclosed. In one embodiment, a network node for a cellular communications network is adapted to determine one or more cell change configurations that are related to CCA failures when one or more wireless devices are performing a cell change to a target cell subject to CCA and provide the one or more cell change configurations to a wireless device.

In one embodiment, a network node for a cellular communications network comprises processing circuitry configured to cause the network node to determine one or more cell change configurations that are related to CCA failures when one or more wireless devices are performing a cell change to a target cell subject to CCA and provide the one or more cell change configurations to a wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 illustrates a transmission opportunity both with and without Channel Occupancy Time (COT) sharing after a successful Clear Channel Access (CCA) at initiating node, which in the illustrated example is the New Radio (NR) base station (gNB);

DETAILED DESCRIPTION

Figure 2:
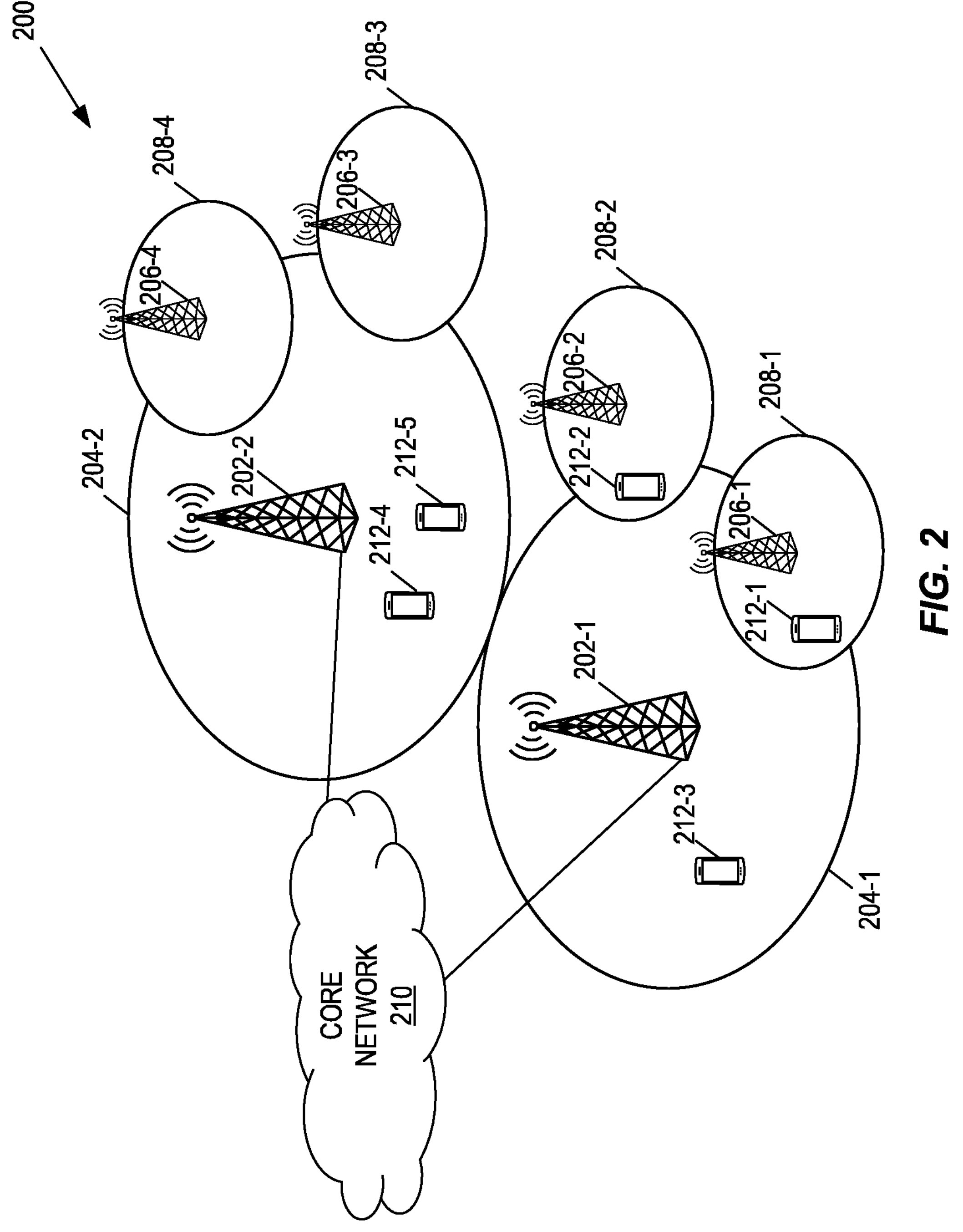
FIG. 2 illustrates one example of a cellular communications system in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features, and advantages of the enclosed embodiments will be apparent from the following description.

In the description provided herein, the term "node" is used. As used herein, a "node" can be a network node or a UE. Examples of network nodes are Node B, base station (BS), multi-standard radio (MSR) radio node such as MSR BS, eNodeB, gNodeB. MeNB, SeNB, integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, RRU, RRH, nodes in distributed antenna system (DAS), core network node (e.g. MSC, MME etc.), O&M, OSS, SON, positioning node (e.g. E-SMLC), etc.

Another example of a node could be a user equipment (UE). As used herein, a "UE" is a non-limiting term that refers to any type of wireless device communicating with a network node and/or with another UE in a cellular or mobile communication system. Examples of a UE are target device, device to device (D2D) UE, vehicular to vehicular (V2V), machine type UE, MTC UE or UE capable of machine to machine (M2M) communication, PDA, Tablet, mobile terminals, smart phone, laptop embedded equipment (LEE), laptop mounted equipment (LME), USB dongles etc.

In some embodiments, generic terminology "radio network node" or simply "network node (NW node)" is used. This can be any kind of network node which may comprise base station, radio base station, base transceiver station, base station controller, network controller, evolved Node B (eNB), Node B, gNodeB (gNB), relay node, access point, radio access point, Remote Radio Unit (RRU) Remote Radio Head (RRH), Central Unit (e.g. in a gNB), Distributed Unit (e.g. in a gNB), Baseband Unit, Centralized Baseband, C-RAN, access point (AP etc.

The term radio access technology, or RAT, may refer to any RAT e.g. UTRA, E-UTRA, narrow band internet of things (NB-IoT), WiFi, Bluetooth, next generation RAT, New Radio (NR), 4G, 5G, etc. Any of the equipment denoted by the terms node, network node or radio network node may be capable of supporting a single or multiple RATs.

The term signal used herein can be any physical signal or physical channel. Examples of physical signals are reference signal such as PSS, SSS, CSI-RS, DMRS, signals in SSB, DRS, CRS, PRS, etc. The term physical channel (e.g., in the context of channel reception) used herein is also called "channel". Examples of physical channels are PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH, etc.

The term time resource used herein may correspond to any type of physical resource or radio resource expressed in terms of length of time. Examples of time resources are: symbol, time slot, subframe, radio frame, TTI, interleaving time, slot, sub-slot, mini-slot, etc.

The term LBT used herein may correspond to any type of CSMA procedure or mechanism which is performed by the node on a carrier before deciding to transmit signals on that carrier. CSMA or LBT may also interchangeably be called clear channel assessment (CCA), clear channel determination etc. The transmission of signals on a carrier subjected to LBT is also called contention-based transmission. On the other hand, the transmission of signals on a carrier which is not subjected to LBT is also called contention free transmission.

The term clear channel assessment (CCA) used herein may correspond to any type of carrier sense multiple access (CSMA) procedure or mechanism which is performed by the device on a carrier before deciding to transmit signals on that carrier. The CCA is also interchangeably called CSMA scheme, channel assessment scheme, listen-before-talk (LBT) etc. The CCA based operation is more generally called contention-based operation. The transmission of signals on a carrier subjected to CCA is also called contention-based transmission. The contention-based operation is typically used for transmission on carriers of unlicensed frequency band. But this mechanism may also be applied for operating on carriers belonging to licensed band for example to reduce interference. The transmission of signals on a carrier which is not subjected to CCA is also called contention free transmission.

The term cell change used herein may comprise any procedure in which the UE changes its serving cell to another (target) cell (cell2) e.g. from cell1 to cell2. Examples of cell change procedures are cell reselection, RRC connection release with redirection, RRC re-establishment, RRC resume etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

The embodiments are described herein in the context of NR operation in unlicensed spectrum (NR-U). However, the solutions are not limited to NR-U scenarios. They are also potentially applicable to LTE-LAA/eLAA/feLAA.

Certain aspects of the present disclosure and their embodiments may provide solutions to the aforementioned or other challenges associated with cell change of a UE to a cell in unlicensed spectrum (i.e., cell change of a UE to a UE that is subject to CCA). The present disclosure comprises several embodiments for a UE and a network node. In a first embodiment in a UE, a method performed by the UE comprises obtaining, at the UE, a cell change configuration from a network node (e.g. a serving network node such as a serving base station (e.g., gNB)), and using the cell change configuration at the UE for carrying out a cell change procedure. Examples of the cell change procedure are cell re-selection, Radio Resource Control (RRC) re-establishment, handover, random access, etc. The cell change configuration may include any one, any combination, or all of the following:

- number of cell change attempts (N), e.g. 3, 5, etc.;
- maximum duration (T) for cell change attempts, e.g. 1000 ms, 2000 ms;
- fallback procedure(s), e.g. attempting cell change back to old cell or to another cell.

When performing the cell change, the UE performs the cell change according to the received cell change configuration, (e.g. by attempting cell change N times over a duration of T) and, if the UE was not able to perform the cell change successfully, the UE follows the fallback procedure. In some embodiments, the fallback procedure includes at least one cell (cell3) configuration that the UE is to use for performing cell change to when the first attempt to cell2 failed. Cell3 (also referred to herein as the fallback cell) may or may not be the same as the old cell (i.e., the source cell), which is sometimes referred to herein as cell1, for the cell change procedure. Examples of cell3 are cell1, any cell on a carrier of cell1, a cell of a carrier belonging to licensed band, a cell belonging to another carrier etc. Note that the target cell for the cell change is sometimes referred to herein as cell2.

In some embodiments, when performing the cell change according to the fallback procedure(s), the UE is allowed to enter a so called relaxed (operational) mode which allows the UE to access cell3 with a relaxed cell change margin. The cell change margin herein means, for example, the signal level above which the UE is allowed to reselect cell3. In one example, the signal level can be an absolute signal level of cell3 e.g. Synchronization Signal Reference Signal Received Power (SS-RSRP) threshold, Synchronization Signal Reference Signal Received Quality (SS-RSRQ) threshold, etc. In another example, the signal level can be a relative signal level of cell3 with respect to a reference signal level value. For example, the reference signal level can be a signal level of a reference cell (cellr). As an example, cellr can be cell1, cell2, or yet another cell (e.g. strongest or next strongest cell in terms of signal level).

In some embodiments, the UE may further be configured to allow the UE to meet one or more relaxed requirements after fallback to cell3, at least over certain period of time (T0). In some embodiments, after T0, the UE is required to revert to meet the normal (e.g., legacy) requirements i.e. one that are not relaxed. In another example, in some embodiments, the UE is allowed to meet the relaxed requirements when served by cell3 until the UE performs cell reselection to yet another cell e.g. to cell4. For example, T0 can be expressed in terms of certain number of time resources e.g. N number of DRX cycles, K radio frames, L SFN cycles, etc. As a special case, T0 can be set to infinity.

Examples of requirements are measurement requirements (e.g. measurement time such as cell identification delay, evaluation period, etc.), measurement accuracy, signal level such as SINR, SS-RSRP, SS-RSRQ, etc. under which the requirement are to be met. The relaxed requirement may imply that the UE can perform cell identification over longer period compared to the period in legacy operation etc. Another example of the relaxed requirement may imply that the UE can perform measurement with accuracy coarser than that compared to the accuracy in the legacy operation etc. The key advantage of this new way of performing cell change is that the UE does not end up with connection failure when the target cell fails to transmit reference signals; instead, the UE is allowed to access a cell where relaxed requirements apply.

The UE embodiment(s) elaborated below can be summarized as follows:

- UE obtaining information related to CCA failures from the serving network node; and
- UE adapting the measurement procedures in the UE based on obtained CCA failure information.

In a second embodiment related to a network node, the network node (e.g., base station such as, e.g., a gNB) obtains information about potential candidate cells for a UE, prepares a cell change configuration based on different factors (e.g., service type, coverage mode, traffic pattern, DRX cycles, etc.), and transmits the cell change configuration to the UE. The transmission can be UE specific (e.g., transmitted using dedicated signaling) or cell specific (e.g., transmitting using broadcast channels).

In some embodiments, a UE obtains information about DL CCA failures, and uses that information to adapt the measurements procedures in serving cell operational tasks.

Certain embodiments may provide one or more of the following technical advantage(s). Cell change failures are reduced, and UE coverage is assured with reduced performance instead of total connection failure. UE mobility procedure is enhanced when operating on a carrier that belongs to an unlicensed band. UE mobility performance is enhanced (e.g. reduced connection failure) even when there is a large number of CCA failures in cells belonging to unlicensed band e.g. under high traffic load.

FIG. 2 illustrates one example of a cellular communications system 200 in which embodiments of the present disclosure may be implemented. In the embodiments described herein, the cellular communications system 200 is a 5G system (5GS) including a NR RAN. In this example, the RAN includes base stations 202-1 and 202-2, which in 5G NR is referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

In the embodiments described herein, at least some of the cells 204, 208 are cells in unlicensed spectrum (e.g., NR-U cells).

A. Methods for Performing Cell Change in a UE

Figure 3:
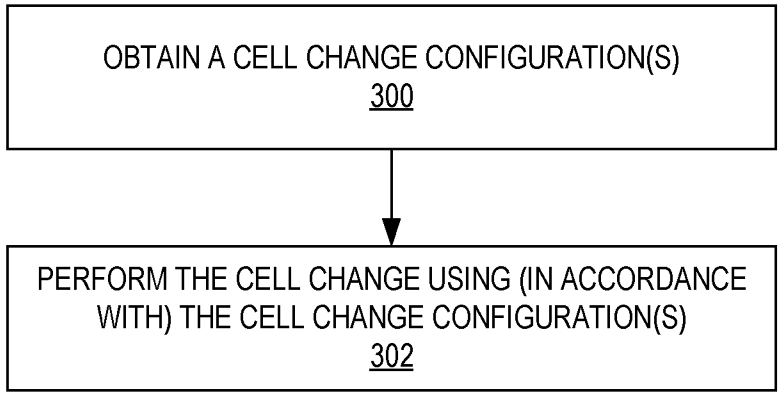
FIG. 3 is a flow chart that illustrates a method performed by a User Equipment (UE) in accordance with embodiments of the present disclosure.

FIG. 3 is a flow chart that illustrates a method performed by a UE in accordance with embodiments of the present disclosure. The UE may be, e.g., the UE 212 of FIG. 2. The steps involved in this UE embodiment can be summarized as follows:

- Step 300: Obtaining a cell change configuration comprising at least information about preventive and fallback mechanisms and associated parameters,
- Step 302: Performing the cell change based on at least obtained cell change configuration The steps are described in more detail below.

a. Step 300: Obtaining a Cell Change Configuration from a Network Node

In this step, the UE obtains information about at least one cell change configuration. In some embodiments, the cell change configuration(s) is obtained from a network node, e.g. the serving network node such as eNB, gNB. The network node may be, e.g., a base station 202 of FIG. 2. The information may be part of a mobility control message or a separate message. The information may be transmitted to the UE in a system information (e.g. in one or more SIBs) in low activity state (e.g., idle state) for cell change in idle state. The information may also be transmitted to the UE in a UE specific message e.g. in a dedicated channel. In some other embodiments, the cell change configuration(s) may be obtained by the UE locally (e.g., from memory or local data storage). For example, the cell change configuration(s) may be predefined (e.g., by standard) or preconfigured where the UE obtains the cell change configuration from, e.g., memory or local data storage. In some other embodiments, the cell change configuration(s) may include a cell change configuration(s) obtained from a network node and a cell change configuration(s) obtained locally. The obtained information may also be referred to as a measurement configuration(s), etc.

As discussed above, during the cell evaluation phase of the cell change procedure (i.e., during Stage-1 of the cell change procedure), the UE, based on the obtained cell change configuration(s), will perform measurements on one or more neighbor cells. For example, the UE may perform measurements on neighbor cells operating on the serving carrier frequency and neighbor cells belonging to one or more non-serving carriers indicated in the obtained configuration information when one or more measurement criteria is met e.g. when the serving cell (cell1) signal measurement (e.g. SS-RSRP, SS-RSRQ etc.) falls below certain signal threshold. In another example, the UE may periodically perform measurements on neighbor cells belonging to one or more non-serving carriers associated with a priority level higher than the priority level of the serving carrier. The priority levels associated with different carrier frequencies are indicated in the configuration information transmitted to the UE by the network node e.g. serving cell.

As discussed below, the measurement results are used by the UE during the cell change procedure (e.g., in Stage-1) to determine whether the UE is to perform a cell change to a target cell (cell2). For example, if the signal measurement of cell2 (e.g. SS-RSRP) is above the signal measurement of cell1 (e.g. SS-RSRP) by at least X dB (e.g. X=3 dB), then the UE is to perform cell change from cell1 to cell2 e.g. cell reselection to cell2. The UE might have performed measurements on multiple neighbor cells, but cell2 has been identified as the most favorable candidate for the cell reselection e.g. based on highest signal level among all measured neighbor cells.

b. Step 302: Performing the Cell Change Based on the Evaluation Result and Obtained Cell Change Configuration In this step, the UE performs or executes the cell change from cell1 to cell2 based on the obtained cell change configuration(s) and the measurement results.

The cell change procedure carried out by the UE to cell2 operating on carrier frequency operating on unlicensed frequency band includes multiple stages, which are all subject to CCA. The cell change procedure broadly comprises at least the following three stages in tandem:

Stage-1: Evaluating cell2 for cell change.

Stage-2: UE acquiring the system information of cell2.

Stage-3: UE performing update to cell2 (if needed) e.g. for tracking area update, RAN Notification Area (RNA) update, location registration, registration area update etc.

Figure 4:
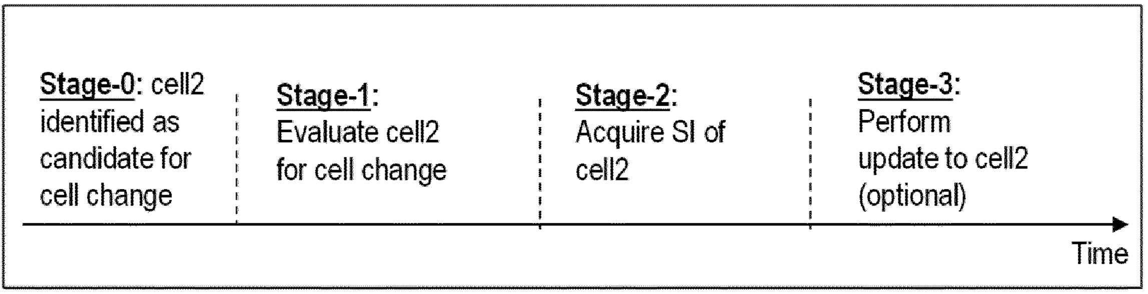
FIG. 4 illustrates stages of a cell change procedure in accordance with some embodiments of the present disclosure.

The above stages are illustrated in FIG. 4. Stage-0 is explained above in the section describing steps 300. FIG. 4 illustrates different stages of cell change procedure in the UE for changing from cell1 to cell2.

In all the above three stages, the UE may not be able to receive and/or transmit relevant signals due to CCA failure experience in the measured cell (cell2) and/or CCA failure experienced in the UE transmission. Failing in any of the above stages may lead to complete failure of the cell change procedure. Consequently, the UE may end up with connection failure and, as a result, will have to initiate the lengthy initial access procedure. These stages may also be referred to as choke points or premature termination points for the cell change.

In order to prevent the choking or premature termination of the ongoing cell change procedure, according to the embodiment, cell change configuration(s) obtained by the UE in step 300 includes a first set (S1) of preventive parameters and a second set (S2) of fallback parameters. The cell change configuration(s) containing the sets, S1 and S2, can be pre-defined, configured at the UE by the network node (e.g. from the serving cell in system information, UE specific message, etc.), or the like, or any combination thereof. In some embodiments, the configuration(s) containing the sets, S1 and S2, can be sent to the UE by the network node in the same message or information element (IE) or in different messages or IEs.

In one exemplary embodiment, the UE can be configured with the same sets, S1 and S2, for all stages of the cell change. In another exemplary embodiment, the UE can be configured with different sets, (e.g. S1-1, S1-2 and S1-3, and, S2-1, S2-2 and S2-3), for different stages of the cell change procedure. In yet another exemplary embodiment, the UE can be configured with the same sets of the parameters for any two of the three stages while different sets of the parameters for the remaining stage.

The purpose of the set, S1, is to prevent the UE from terminating the ongoing cell change procedure prematurely due to CCA failure in the target cell, cell2, and/or in the UE. Examples of the parameters in S1 are:

Maximum number of allowed missed occasions (Nij) containing signal type, j, in stage-i, due to CCA failure after which the UE abandons or terminates the ongoing cell change procedure. Examples of Nij are 3, 4, 5 etc.

Maximum duration (Tij) in stage-i over which the UE may miss occasions containing signal type, j, due to CCA failure and after which the UE abandons or terminates the ongoing cell change procedure. Examples of Tij are 1000 ms, 2000 ms etc.

Maximum duration (Lij) in stage-i after which the UE abandons or terminates the ongoing cell change procedure provided that during Lij the UE has missed at least certain number of occasions (Mij) containing signal type, j, due to CCA failure. Examples of Tij are 2000 ms, 4000 ms etc.

The purpose of the set, S2, is to enable the UE to continue the cell change procedure to another cell (e.g. cell3 or cell1) in case the UE has not successfully performed cell change to cell2 even after applying the parameters in the set, S1. Examples of the parameters in S2 are:

Information about a set of target cells (e.g. cell3) in case the UE has not successfully performed cell change to cell2, Signal margins to be used by the UE for performing cell change to another cell after failing to perform cell change to cell2, Operating parameters (e.g. duration) for enabling operation on new cell (e.g. cell3) after performing cell change to the new cell.

The above three stages and the use of the sets of parameters, S1 and S2, are described below.

i. Stage-1: Preventive and Fallback Mechanisms During Evaluation of Cell Change Criteria for Changing from Cell1 to Cell2

In one example, the evaluation of the cell change criteria is based on a comparison between signal measurements performed by the UE on the serving cell (cell1) and neighbor cells e.g. cell2. In this case for example if the signal measurement (e.g. RSRP) of the target cell (cell2) is larger than the signal measurement (e.g. RSRP) of the target cell (cell2) by certain margin (e.g. X dB) over a certain time duration (D0), then the cell change criteria is met. This approach for evaluating the target cell for the cell change may be referred to as cell ranking.

In another example, the evaluation of the cell change criteria is based on signal measurements performed by the UE on the neighbor cells e.g. cell2. In this case for example if the signal measurement (e.g. RSRP, RSRQ) of the target cell (cell2) is larger than certain margin (e.g. Y1 dBm, Y2 dB etc.) over a certain time duration (D1), then the cell change criteria is met.

If the UE does not meet the cell change criteria for cell2, then the UE continues performing measurements on serving and neighbor cells based on the measurement configuration acquired from the existing serving cell i.e. cell1.

However, during the evaluation of the cell change criteria (e.g. over D0 or D1), if there is CCA failure in the downlink of cell2, then the UE will not receive the reference signal (e.g. SSB) from cell2. Therefore, due to CCA failure in cell2, the UE will not be able to perform measurement on cell2. The UE may not be able to complete the evaluation of the cell change criteria to cell2. If the UE cannot complete the evaluation of the cell change criteria due to the CCA failure, then the UE cannot be certain whether cell2 is better rank than cell1 or cell2 is suitable for cell change. In existing solutions, the UE is allowed to prematurely terminate the cell change procedure under such situations e.g. if the UE cannot receive the required signals (e.g. SSB) from cell2 with sufficient signal level e.g. SINR≥−4 dB. Therefore, the UE will remain camped on cell1 or eventually lose its connection with respect to cell1 if its signal level falls below certain threshold.

Preventive Mechanism:

According to one embodiment, the UE will use the preventive set of parameters, S1, associated with stage-1 to prolong the evaluation of the cell change criteria as elaborated below.

According to one aspect of this embodiment, the UE will continue evaluating the cell change criteria provided that the UE does not miss a number of occasions containing certain type of signal type j (e.g. SSB, CSI-RS etc.) from cell2 due to CCA failure larger than a certain threshold (e.g. N1j). According to yet another aspect of this embodiment, the UE will continue evaluating the cell change criteria provided that the UE does not miss a number of occasions containing certain type of signal type j (e.g. SSB, CSI-RS etc.) from cell2 due to CCA failure over more than certain duration (e.g. T1j). According to yet another aspect of this embodiment, the UE will continue evaluating the cell change criteria provided that the UE does not miss more than certain number of occasions (M1j) containing certain type of signal type j (e.g. SSB, CSI-RS etc.) from cell2 due to CCA failure over more than certain duration (e.g. L1j). A general example is shown in Table 1 below. A specific example where the UE may use three different types of signals for measurements (e.g. SSB, CSI-RS and tracking reference signal (TRS) is shown in Table 2 below. Another specific example with numerical figures where the UE may use three different types of signals for measurements (e.g. SSB, CSI-RS, and tracking reference signal (TRS)) is shown in Table 3 below. As special case, the UE may use only one type of signal in stage-1 e.g. SSB. Yet another example of the special case is that: the value of Nij is the same for all types of signals, the value of Tij is the same for all types of signals, the value of Lij is the same for all types of signals, and the value of Mij is the same for all types of signals.

TABLE 1

A general example with set of preventive parameters, S1, for stage-1, associated with different types of signals subjected to CCA and are used by the UE in stage-1

| Type of Signal subject to CCA | Threshold(s) for UE preventing cell change failure due to CCA failure | | | |
|---|---|---|---|---|
| | Maximum number of allowed missed occasions due to CCA failure | Maximum duration over which missed occasions due to CCA failure are allowed | Maximum duration (Lij) over which maximum number (Mij) of missed occasions due to CCA failure are allowed | |
| | | | Lij | Mij |
| # 1 | N11 | T11 | L11 | M11 |
| #2 | N12 | T12 | L12 | M12 |
| | . . . | . . . | . . . | . . . |
| #k | N1k | T1k | L1k | M1k |

TABLE 2

Specific example with set of preventive parameters, S1, for stage-1, associated with three different types of signals subjected to CCA and are used by the UE in stage-1

| Type of Signal subject to CCA | Threshold(s) for UE preventing cell change failure due to CCA failure | | | |
|---|---|---|---|---|
| | Maximum number (Nij) of allowed missed occasions due to CCA failure | Maximum duration (Tij) over which missed occasions due to CCA failure are allowed | Maximum duration (Lij) over which maximum number (Mij) of missed occasions due to CCA failure are allowed | |
| | | | Lij | Mij |
| # SSB | N11 | T11 | L11 | M11 |
| # CSI-RS | N12 | T12 | L12 | M12 |
| # TRS | N13 | T13 | L13 | M13 |

TABLE 3

Specific example with set of preventive parameters, S1, for stage-1, associated with three different types of signals subjected to CCA and are used by the UE in stage-1

| Type of Signal subject to CCA | Threshold(s) for UE preventing cell change failure due to CCA failure | | | |
|---|---|---|---|---|
| | Maximum number (Nij) of allowed missed occasions due to CCA failure | Maximum duration (Tij) over which missed occasions due to CCA failure are allowed | Maximum duration (Lij) over which maximum number (Mij) of missed occasions due to CCA failure are allowed | |
| | | | Lij | Mij |
| # SSB | 4 | 1000 ms | 2000 ms | 6 |
| # CSI-RS | 4 | 1000 ms | 4000 ms | 5 |
| # TRS | 2 | 400 ms | 800 ms | 3 |

If the UE meets the cell change criteria for cell2 (e.g. after applying the set of parameters, S1, if needed), then the UE reselects cell2. In this case, the UE after cell reselection to cell2 proceeds to the next stage (stage-2 e.g. acquiring system information for cell2) as explained in the next section.

Figure 5:
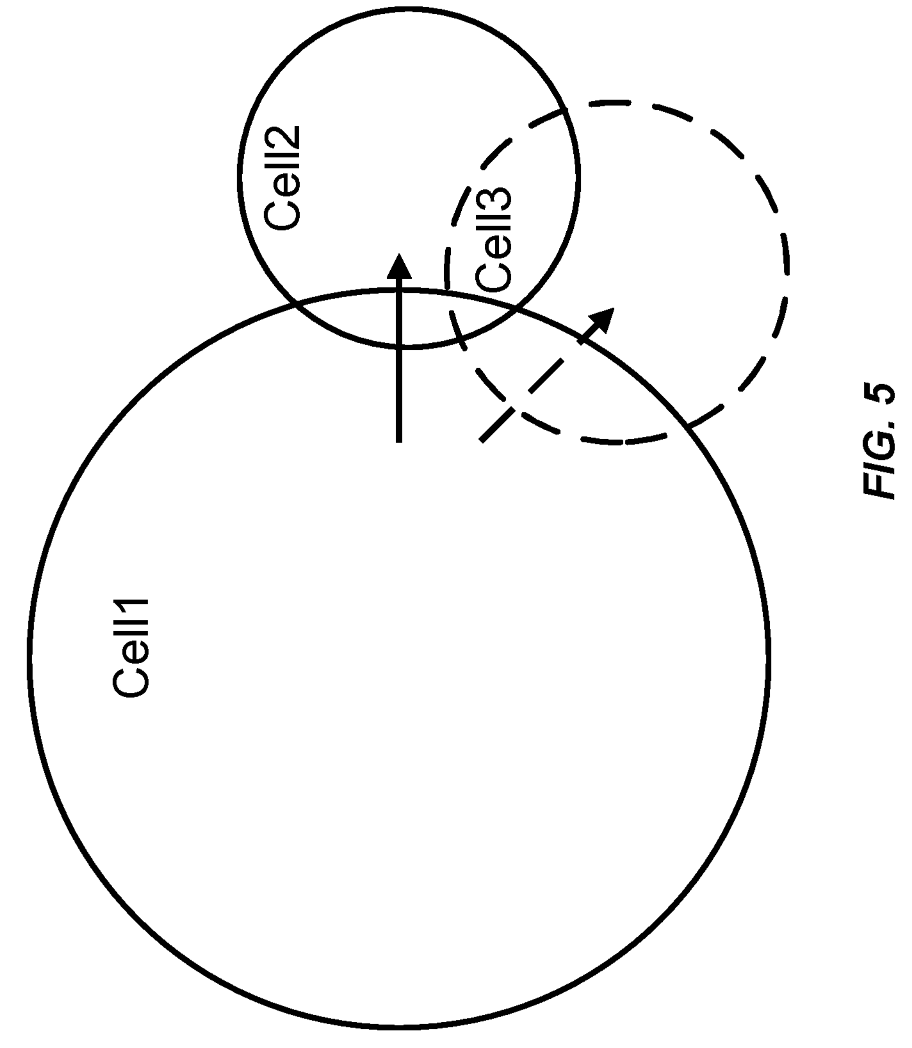
FIG. 5 illustrates an example of a cell change procedure.

Fallback Mechanism:

However, if the UE cannot meet the cell change criteria for cell2 even after applying the set of parameters, S2, associated with stage-1 (as explained above), then the UEs stops evaluation of cell2 for cell change and instead uses the fall back mechanisms to perform the cell change to another cell, cell3. The cell change scenario is exemplified in FIG. 5 (example of IDLE mode mobility affected by CCA failures) where it is assumed that the UE is re-selecting from cell1 on a first carrier frequency (F1) belonging to licensed band or unlicensed band to cell2 on a second carrier frequency (F2) belonging to unlicensed band. But if the UE cannot meet the cell change criteria, then the UE fallbacks to cell3.

An example of the set of fallback parameters is shown in Table 4 below. One example comprises a set of information associated with a cell (e.g. cell ID of cell3) to which the UE should reselect. In one example, cell3 is the same as cell1. In another example, cell3 is any cell operating on the carrier frequency (F1) of the serving cell (cell1). In another example, cell3 is a cell operating on an indicated carrier e.g. on carrier F3. In yet another example, cell3 is a cell operating on a carrier belonging to a licensed band. The information may also comprise priority levels the carriers and/or cells in case the information comprises multiple carriers and/or cells as candidates for fallback.

The fallback parameters may also comprise a signal margin associated with cell change to cell3 due to fallback. The signal margin is used by the UE for evaluating cell change criteria for cell3. The signal margin under fallback may be smaller than the margin used for cell change under normal situation (i.e. non-fallback situation). For example, the UE is allowed to reselect to cell3 under fallback situation with lower signal margin (e.g. X1 dB lower) compared to margin (X) used for cell change under normal situation. As an example the UE can select to cell3 provided that the signal measurement with respect to cell3 is (X-X1) dB lower compared to the signal measurement with respect to cell1.

The fallback parameters may also comprise duration (D3) over the UE is allowed to meet relaxed requirements after the UE has performed the cell change to cell3 due to the fallback mechanism. For example, the UE may be allowed to perform measurements on neighbor cells during D3 over a longer period compared to the period used for performing measurements when no fallback mechanism is used.

The key difference between the original cell change attempt to cell2 and fallback cell change attempt to cell3 is that UE is allowed to access the target cell using a relaxed (operational) mode. The relaxed cell change mode is characterized by a cell change which is performed using a relaxed cell change margin(s). The cell change margin herein means, for example, the signal level above which the UE is allowed to reselect cell3. In one example, the signal level can be absolute signal level of cell3 e.g. SS-RSRP threshold, SS-RSRQ threshold etc. In another example, the signal level can be a relative signal level of cell3 with respect to a reference signal value. For example, the reference signal level can be signal level of a reference cell (cellr). As an example cellr can be cell1, cell2 or yet another cell.

Generally, the relaxed cell change mode can be expressed using a general function (F) as follows:

$$P = F(C, M_{rxlev}, K_{qual}, \mu) \tag{1}$$

where:

C is referred to the Cell suitability criterion, e.g. S-criterion.

$M_{rxlev}$ is a margin that added to signal strength measurement Srxlev in the S-criterion $K_{qual}$ is a margin that added to signal quality measurement Squal in the S-criterion μ is an optional UE implementation margin or margin that depends on the type of LBT employed in the target cell; as special case p can be negligible.

In a specific example, the relaxed cell change mode can be expressed as follows:

$$Srxlev > 0 \text{ AND Squal} > 0 \tag{2}$$

where

- $Srxlev = Q_{rxlevmeas} - (Q_{rxlevmin} + Q_{rxlevminoffset}) - P_{compensation} - Q\text{offset}_{temp} + M_{rxlev}$
- $Squal = Q_{qualmeas} - (Q_{qualmin} + Q_{qualminoffset}) - Q\text{offset}_{temp} + K_{qual}$ where Srxlev is a cell selection receive (RX) level value (dB), Squal is a cell selection quality value (dB), $\text{Qoffsett}_{temp}$ is an offset temporarily applied to a cell as specified in 3GPP TS 36.331 (dB), $Q_{rxlevmeas}$ is a measured cell RX level value (RSRP), $Q_{qualmeas}$ is a measured cell quality value (RSRQ), $Q_{rxlevmin}$ is a minimum required RX level in the cell (dBm), $Q_{qualmin}$ is a minimum required quality level in the cell (dB), $Q_{rxlevminoffset}$ is an offset to the signaled $Q_{rxlevmin}$ taken into account in the Srxlev evaluation as a result of a periodic search for a higher priority PLMN while camped normally in a Visited PLMN (VPLMN), $Q_{qualminoffset}$ is an offset to the signaled $Q_{qualmin}$ taken into account in the Squal evaluation as a result of a periodic search for a higher priority PLMN while camped normally in a VPLMN, $P_{compensation}$ is defined as follows:

If the UE supports the additionalPmax in the NS-PmaxList, if present, in SIB1, SIB3 and SIB5:

$$\max(P_{EMAX1} - P_{POWERCLASS}, 0) - (\min(P_{EMAX2}, P_{POWERCLASS}) - \min(P_{EMAX1}, P_{POWERCLASS}))\ \text{(dB)};$$

Else if $P_{PowerClass}$ is 14 dBm:

$$\max(P_{EMAX1} - (P_{POWERCLASS} - P\text{offset}), 0)\ \text{(dB)};$$

Else:

$$\max(P_{EMAX1} - P_{POWERCLASS}, 0)\ \text{(dB)},$$

$P_{EMAX1}$, $P_{EMAX2}$ are maximum TX power level a UE may use when transmitting on the uplink in the cell (dBm) defined as $P_{EMAX}$ in 3GPP TS 36.101. $P_{EMAX1}$ and $P_{EMAX2}$ are obtained from the p-Max and the NS-PmaxList respectively in SIB1, SIB3 and SIB5 as specified in 3GPP TS 36.331, and $P_{PowerClass}$ is a maximum Radio Frequency (RF) output power of the UE (dBm) according to the UE power class as defined in 3GPP TS 36.101.

Furthermore, after accessing the cell3 using a fallback procedure (i.e. based on a relaxed cell change mode), the UE can be allowed to meet one or more relaxed requirements at least over a period of time (T0). After T0, the UE is required to revert to meet the normal (legacy) requirements i.e. one that are not relaxed. For example, T0 can be expressed in terms of certain number of time resources e.g. N number of DRX cycles, K radio frames, L SFN cycles etc. As special case T0 can be set to infinity.

In another example the UE is allowed to meet the relaxed requirements when served by cell3 until the UE performs cell reselection to yet another cell e.g. to cell4.

The relaxed measurement mode is characterized by one or more relaxed measurement requirements with respect to reference measurement requirements. Examples of relaxed measurement requirements are: measurement period longer than a reference measurement period, measurement accuracies include bias larger than a reference bias, measurement accuracies larger than a reference measurement accuracy etc. For example, with the relaxed measurement requirements a longer delay (e.g. larger than certain threshold) can be allowed for the UE to perform various operational tasks, e.g. radio link monitoring, handover, neighbor cell detection, cell re-selection etc. As an example, the reference measurement requirements may correspond to those defined for normal measurement mode.

The normal measurement mode, on the other hand, is characterized by tighter measurement requirements with respect to reference measurement requirements. In some implementation the tighter measurement requirements may correspond to the reference measurement requirements e.g. those defined for normal measurement mode. Examples of tighter measurement requirements are: the measurement period is shorter than a reference measurement period, measurement accuracies include bias smaller than a reference bias etc. For example with the tighter measurement requirements the UE can be required to perform various operational tasks in shorter times compared to relaxed measurement mode.

The key advantage of this new way of performing cell change is that the UE does not end up with connection failure when the target cell fails to transmit reference signals instead it is allowed to access a cell where relaxed requirements apply.

TABLE 4

| Examples of set of fallback parameters, S2. | | |
|---|---|---|
| Information about fallback cell(s) | Signal margins after fallback | Operating parameters after fallback |
| Information about fallback carrier(s)<br><br><br>Cell ID(s)<br>Priority levels associated with carrier(s)<br>Priority levels associated with cell(s) | Signal margin for evaluating cell3 under fallback is X1 dB lower than the margin used for evaluating a cell under normal (non-fallback) cell change procedure. | Duration (D2) over the UE can meet relaxed requirements after fallback to cell1. |

ii. Stage-2: Preventive and Fallback Mechanisms During System Information Acquisition of Cell2

The UE in stage-2 acquires the system information (SI) of cell2. The UE acquires SI for determining several aspects related to cell2. For example, whether the UE is allowed to camp on cell2 (e.g. if cell2 is barred or not), whether cell2 belongs to the same tracking area and/or registration area as of cell1, whether cell2 belongs to the same radio access network (RAN) notification area (RNA) as of cell1, acquisition of necessary parameters (e.g. random access parameters etc.) for accessing cell2 (if required e.g. as in stage-3) etc.

However, the UE may or may not succeed in successfully receiving the system information (SI) of cell2 in stage-2 due to CCA failures in the DL of cell2. The SI comprises one or multiple segments or blocks of data or broadcast information e.g. master information block (MIB), system information (SIB1), SIB2 etc. The different blocks or segments are transmitted over different time resources and are subjected to CCA.

For example, the UE may not receive one or more occasions containing the broadcast channel (e.g. PBCH) containing MIB due to CCA failures in cell2. The UE, for may not receive one or more occasions containing one or more system information blocks (e.g. SIB1, SIB2 etc.) due to the CCA failures in cell2. In the existing solutions if the UE does not receive necessary blocks then the UE may abandon the SI acquisition for example assuming that the signal quality of cell2 at the UE is below the threshold e.g. cell2 SINR is below −4 dB. However, in reality the cell2's signal quality at the UE should be adequate enough to receive the SI.

Preventive Mechanism for Stage-2:

According to one embodiment, the UE uses the preventive set of parameters, S1, associated with stage-2 (SI acquisition phase) to prolong the time over which the UE should attempt to acquire the SI of cell2. According to one aspect of this embodiment, the UE continues acquiring the SI of cell2 provided that the UE does not miss a number of occasions containing certain type of SI block or segment j (e.g. MIB, SIB1 etc.) from cell2 due to CCA failure larger than certain threshold (e.g. N2j). According to yet another aspect of this embodiment, the UE continues acquiring the SI of cell2 provided that the UE does not miss a number of occasions containing certain type of SI block or segment j (e.g. MIB, SIB1 etc.) from cell2 due to CCA failure over more than certain duration (e.g. T2j). According to yet another aspect of this embodiment, the UE continues acquiring the SI of cell2 provided that the UE does not miss more than certain number of occasions (M1j) containing certain type of SI block or segment j (e.g. MIB, SIB1 etc.) from cell2 due to CCA failure over more than certain duration (e.g. L2j). A general example is shown in Table 5 below. A specific example where the UE acquires MIB and different types of SIBs (e.g. SIB1, SIB2, SIB3 etc. is shown in Table 6 below. Another specific example with numerical figures where the UE may have to acquire only MIB and SIB1 is shown in Table 7 below. As special case, the UE may use only or few segments of SI (e.g. MIB or MIB and SIB1) in stage-1. Yet another example of the special case is that: the value of Nij is the same for all types of SI blocks, the value of Tij is the same for all types of SI blocks, the value of Lij is the same for all types of SI blocks and the value of Mij is the same for all types of SI blocks.

TABLE 5

A general example with set of preventive parameters, S1, for stage-2, associated with different blocks of SI subjected to CCA and are used by the UE in stage-2

| Type of SI block subject to CCA | Threshold(s) for UE preventing cell change failure due to CCA failure | | | |
|---|---|---|---|---|
| | Maximum number of allowed missed occasions due to CCA failure | Maximum duration over which missed occasions due to CCA failure are allowed | Maximum duration (Lij) over which maximum number (Mij) of missed occasions due to CCA failure are allowed | |
| | | | Lij | Mij |
| # 1 | N21 | T21 | L21 | M21 |
| #2 | N22 | T22 | L22 | M22 |
| | . . . | . . . | . . . | . . . |
| #k | N2k | T2k | L2k | M2k |

TABLE 6

A general example with set of preventive parameters, S1, for stage-2, associated with different blocks of SI subjected to CCA and are used by the UE in stage-2

| Type of SI block subject to CCA | Threshold(s) for UE preventing cell change failure due to CCA failure | | | |
|---|---|---|---|---|
| | Maximum number of allowed missed occasions due to CCA failure | Maximum duration over which missed occasions due to CCA failure are allowed | Maximum duration (Lij) over which maximum number (Mij) of missed occasions due to CCA failure are allowed | |
| | | | Lij | Mij |
| MIB | N21 | T21 | L21 | M21 |
| SIB1 | N22 | T22 | L22 | M22 |
| . . . | . . . | . . . | . . . | . . . |
| SIBk | N2k | T2k | L2k | M2k |

TABLE 7

A general example with set of preventive parameters, S1, for stage-2, associated with MIB and SIB1 subjected to CCA and are used by the UE in stage-2

| Type of SI block subject to CCA | Threshold(s) for UE preventing cell change failure due to CCA failure | | | |
|---|---|---|---|---|
| | Maximum number of allowed missed occasions due to CCA failure | Maximum duration over which missed occasions due to CCA failure are allowed | Maximum duration (Lij) over which maximum number (Mij) of missed occasions due to CCA failure are allowed | |
| | | | Lij | Mij |
| MIB | 4 | 320 ms | 1000 ms | 6 |
| SIB1 | 8 | 2000 ms | 4000 ms | 8 |

If the UE can successfully receive all the necessary SI blocks or segments during stage-2 (after applying the prevent set of parameters if needed) then the UE may proceed with stage-3 (if this is needed). Otherwise the UE may assume that the cell change to cell2 is successful and the UE will be served by cell2.

Fallback Mechanism for Stage-2:

However, if the UE cannot successfully receive all the necessary SI blocks or segments during stage-2 even after applying the set of parameters, S2, associated with stage-2 (as explained above) then the UE stop acquiring the SI of cell2 and instead uses the fall back mechanisms to perform the cell change to another cell, cell3. The fallback mechanism and the examples of the associated parameters used for the cell change to cell3 are the same as described above regarding the fallback mechanism for stage-1.

iii. Stage-3: UE Performing Update to Cell2

In this stage (stage-3) of the cell change procedure, the UE performs one or more different types of update to cell2 provided that the UE is required to perform the updates. If the required updates to cell2 is not performed by the UE then the cell change to cell2 is not considered completed and as consequence the UE will have to abandon cell2.

In one example, the UE uses the acquired system information in stage-2 to determine whether the UE is required to perform one or more updates. For example, based on the acquired SI of cell2, the UE may determine whether the UE has to perform any one or more of the following updates:

tracking area update,

RAN Notification Area (RNA) update, location registration, registration area update etc.

Identifiers of the PLMN, tracking areas, RNA, registration area, etc. are transmitted in the SI of cell2. For example, if cell1 and cell2 belong to different tracking area, then the UE performs a tracking area update to cell2. In another example, if cell1 and cell2 belong to different RNA, then the UE performs a RNA update to cell2. The RNA update is typically performed during RRC inactive state.

In order to perform any type of update to cell2, the UE first performs random access to cell2 in order to establish the connection to cell2. By performing this step, the UE also switches to RRC CONNECTED state and performs the necessary steps involved in performing the update e.g. tracking area update, RNA update etc.

The, random access, procedure comprises:

transmitting an uplink signal (e.g. message #1 as preamble), receive a downlink message (message #2 e.g. allocation of resources, TA command etc.) during random access response (RAR) window, transmitting uplink message (message #3 e.g. contention resolution).

If the RA is successful, then the UE establishes normal communication (in RRC connected state) with cell2 to perform the necessary updates e.g. signaling between the UE and the core network etc. If there is any CCA failure during the update procedure (when in RRC connected), then the serving cell2 will handle this according to procedure associated with the RRC connected state.

However during the RA procedure, the UE is still in low activity state. In the existing solutions, in case of RA failure, the UE abandons the update to cell2. As an example, this may occur due to any one or more of:

low signal quality experienced at the base station when receiving messages #1 and/or 3.

low signal quality experienced at the UE when receiving message #2.

Preventive Mechanism for Stage-3:

According to an embodiment, the UE uses the preventive set of parameters, S1, associated with stage-3 (update to cell2) to prolong the time over which the UE should successfully perform RA to cell2. If the random access (RA) is successful, then the UE can perform one or more different types of updates to cell2. According to one aspect of this embodiment, the UE continues performing the RA to cell2 provided that the UE does not miss number of occasions containing certain type of RA message j (e.g. message #1, etc.) due to CCA failure larger than certain threshold (e.g. N3j). According to yet another aspect of this embodiment, the UE continues performing the RA to cell2 provided that the UE does not miss number of occasions containing certain type of RA message j (e.g. message #1, etc.) due to CCA failure over more than certain duration (e.g. T3j). According to yet another aspect of this embodiment, the UE continues performing RA to cell2 provided that the UE does not miss more than certain number of occasions (M3j) containing certain type of RA message j (e.g. message #1, etc.) due to CCA failure over more than certain duration (e.g. L3j). A general example comprising preventive set of parameters associated with three different RA messages is shown in Table 8 below. A specific example where the UE performs RA to cell2 involving three RA messages (e.g. messages #1, #2, and #3) is shown in Table 9 below. As special case is the value of Nij is the same for all types of the RA messages, the value of Tij is the same for all types the RA messages, the value of Lij is the same for all types the RA messages and the value of Mij is the same for all types the RA messages.

TABLE 8

A general example with set of preventive parameters, S1, for stage-3, associated with different RA messages subjected to CCA and are used by the UE in stage-3

| RA message type subject to CCA | Threshold(s) for UE preventing cell change failure due to CCA failure: Maximum number of allowed missed occasions due to CCA failure | Maximum duration over which missed occasions due to CCA failure are allowed | Maximum duration (Lij) over which maximum number (Mij) of missed occasions due to CCA failure are allowed: Lij | Mij |
|---|---|---|---|---|
| # 1 | N31 | T31 | L31 | M31 |
| # 2 | N32 | T32 | L32 | M32 |
| # 3 | N33 | T33 | L33 | M33 |

TABLE 9

A specific example with set of preventive parameters, S1, for stage-3, associated with different RA messages subjected to CCA and are used by the UE in stage-3

| RA message type subject to CCA | Threshold(s) for UE preventing cell change failure due to CCA failure: Maximum number of allowed missed occasions due to CCA failure | Maximum duration over which missed occasions due to CCA failure are allowed | Maximum duration (Lij) over which maximum number (Mij) of missed occasions due to CCA failure are allowed: Lij | Mij |
|---|---|---|---|---|
| # 1 | 4 | 100 ms | 200 ms | 4 |
| # 2 | 4 | 400 ms | 800 ms | 6 |
| # 3 | 4 | 400 ms | 800 ms | 6 |

Fallback Mechanism for Stage-3:

If the UE cannot successfully perform the RA procedure (e.g. not successfully transmitted messages 1 and 3 to cell2, and, received message #2 from cell2) during stage-3 even after applying the prevent set of preventive parameters, P, associated with stage-3 (as explained above), then the UE stops performing the RA to cell2. In this case the UE uses the fall back mechanisms to perform the cell change to another cell, cell3. The fallback mechanism and the examples of the associated parameters used for the cell change to cell3 are the same as described in the description of the fallback mechanism for stage-1.

iv. Total Time to Perform Cell Change: Stages-1, 2, and 3

In summary, there is an uncertainty in time in each stage involved in the cell change procedure due to the CCA failure, and each of these contributes to a total time (Tt) to perform the cell change to cell2 (comprising stages-1, 2 and 3) which can be expressed in a generic was as follows:

$$Tt = F(Ts1, Ts2, Ts3, \Delta T1, \Delta T2, \Delta T3) \quad (3)$$

where

ΔT1=the uncertainty in time in UE succeeding the first stage (stage-1) of cell change procedure and this depends on the CCA failures and the preventive set of parameters (S1) related to stage-1.

ΔT2=the uncertainty in time in UE succeeding the second stage (stage-2) of cell change procedure and this depends on the CCA failures and the preventive set of parameters (S1) related to stage-2.

ΔT3=the uncertainty in time in UE succeeding the third stage (stage-3) of cell change procedure and this depends on the CCA failures and the preventive set of parameters (S1) related to stage-3.

Ts1=this is the time to perform stage-1 cell change procedure if stage-1 is not subject to CCA failure e.g. Ts1 is the time to perform stage-1 in legacy.

Ts2=this is the time to perform stage-2 cell change procedure if stage-2 is not subject to CCA failure e.g. Ts2 is the time to perform stage-2 in legacy.

Ts3=this is the time to perform stage-3 cell change procedure if stage-3 is not subject to CCA failure e.g. Ts3 is the time to perform stage-3 in legacy.

A specific example of the total time to perform cell change procedure to cell2 when subject to CCA can be expressed as:

$$Tt = (Ts1 + \Delta T1) + (Ts2 + \Delta T2) + (Ts3 + \Delta T3) \quad (4)$$

c. More Detailed Example Embodiment

Figure 6:
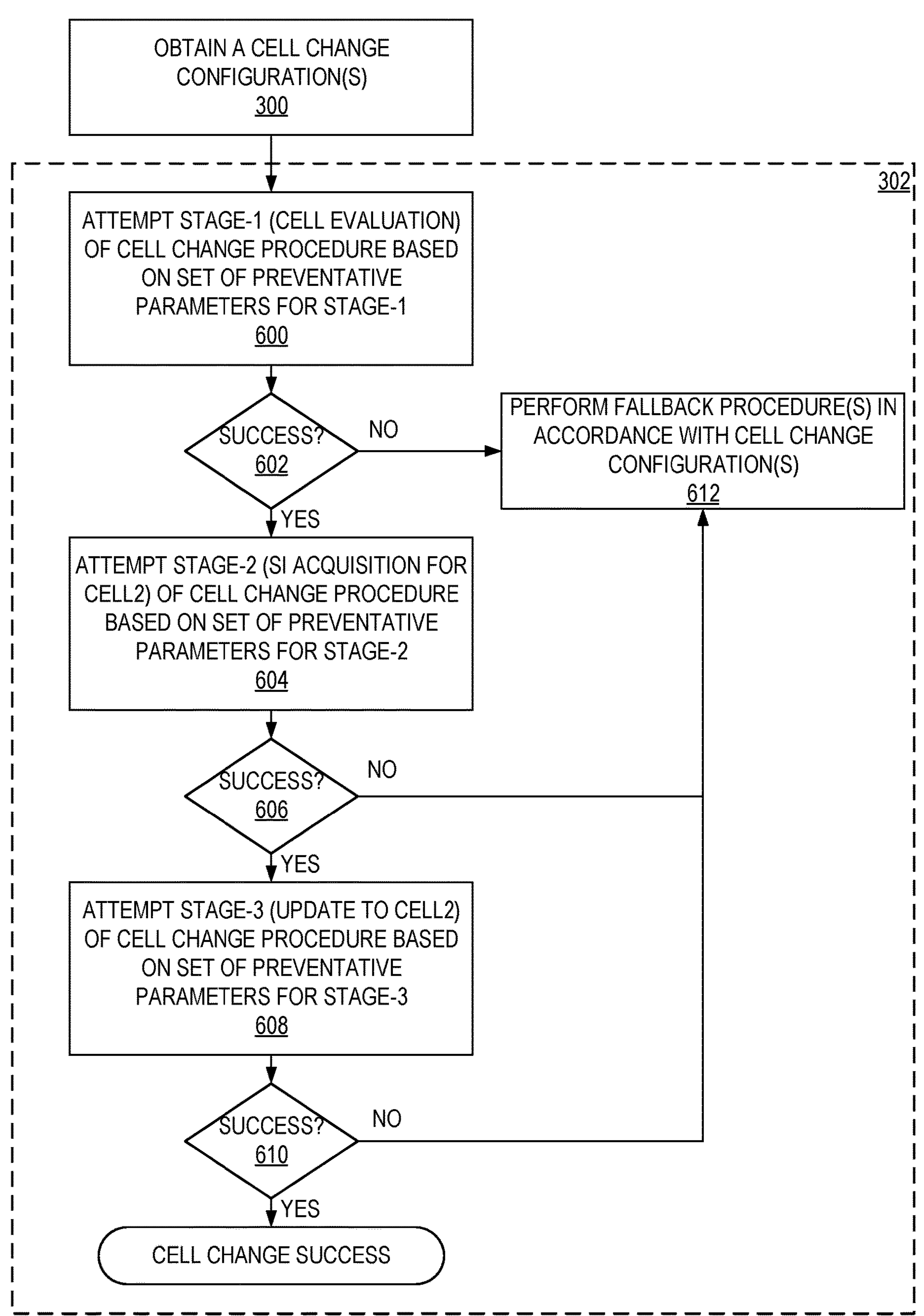
FIG. 6 is a flow chart that illustrates a process performed by a UE in accordance with at least some aspects of the present disclosure.

FIG. 6 is a flow chart that illustrates a process performed by a UE in accordance with at least some aspects of the embodiments described above. The process of FIG. 6 is similar to that of FIG. 3 except that a more detailed version of step 302 is shown in accordance with at least some aspects of the embodiments described above. As discussed above, preferably, the source cell (cell1) for the cell change is preferably in the licensed spectrum or unlicensed spectrum, and the target cell (cell2) is in the unlicensed spectrum. As illustrated, the UE obtains a cell change configuration(s) (step 300) and performs a cell change procedure based on the cell change configuration(s) (step 302).

In this example embodiment, the cell change configuration(s) includes a set of preventative parameters (S1) for each stage of the cell change procedure and a set of fallback parameters (S1) that define a fallback procedure(s) for each stage of the cell change procedure. As described above, the set S1 may be the same for all stages of the cell change procedure, may be the same for some stage(s) and different for other stage(s) of the cell change procedure, or may be different for each stage of the cell change procedure. Likewise, the set S2 may be the same for all stages of the cell change procedure, may be the same for some stage(s) and different for other stage(s) of the cell change procedure, or may be different for each stage of the cell change procedure.

The UE performs the cell change procedure based on the cell change configuration(s) as follows. The UE first attempts to perform stage-1 (cell evaluation) of the cell change procedure based on the set of preventative parameters (S1) for stage-1, as described above (step 600). If stage-1 is successful (step 602, YES), the UE then attempts to perform stage-2 (SI acquisition for the target cell, cell2) based on the set of preventative parameter (S1) for stage-2 (step 604). If stage-2 is successful (step 606, YES), the UE then attempts to perform stage-3 (update to cell2) of the cell change procedure based on the set of preventative parameters (S1) for stage-3, as described above. If stage-3 is successful, (step 610, YES), then the cell change procedure is successfully completed. However, if any stage of the cell change procedure is unsuccessful (i.e., for step 602, NO, for step 606, NO, or for step 610, NO), the UE performs one or more fallback procedures in accordance with the set of fallback parameters (S2) for the respective stage at which the failure occurred, as described above (step 612).

Figure 7:
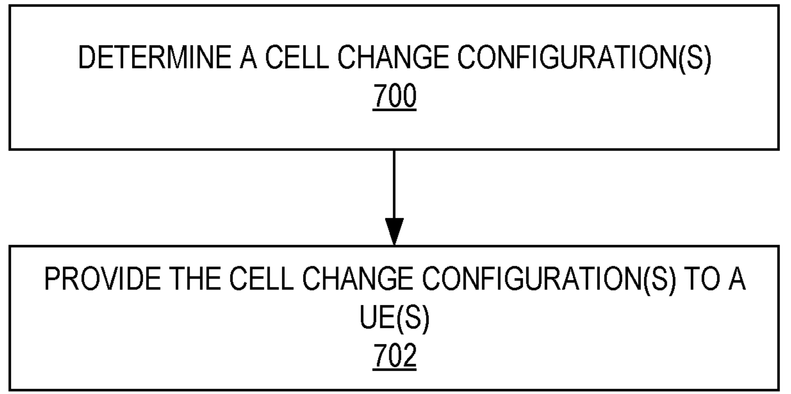
FIG. 7 is a flow chart that illustrates a process performed by a network node (e.g., a base station) in accordance with some embodiments of the present disclosure.

B. Methods in a Network Node for Determining Cell Change Configurations and Signaling to a Wireless Device This embodiment is related to a network node, and involves the network node determining the information about preventive and/or fallback mechanisms and associated parameters based on certain information and informing this to the UE. This is illustrated in FIG. 7. More specifically, FIG. 7 is a flow chart that illustrates a process performed by a network node (e.g., a base station such as, e.g., an eNB or gNB) in accordance with some embodiments of the present disclosure. As illustrated, the network node determines a cell change configuration(s) (step 700) and provides the cell change configuration(s) to a UE (step 702. As discussed above, the network node may provide the cell change configuration(s) to the UE via dedicated signaling or via broadcast signaling. Note that all of the details described above for the various embodiments and aspects related to the providing of the cell change configuration(s) to the UE and to content of the cell change configuration(s) itself are also applicable here.

Preventive Mechanism:

The description about preventive mechanism also applies here.

Fallback Mechanism:

The description about fallback mechanism also applies here.

In addition, the network node may take into account the following when determining the preventive and/or fallback mechanism:

- Device type; e.g. low-cost/complexity or sensor type of UEs (e.g. UEs with single receive antennas and reduced BW) which transmit data infrequently or high-end UEs (e.g. NR Rel-15 UE with multiple receive antennas). For example, a high end UE may be able to account for failed samples by e.g. accumulating across a certain range/boundary which a low-cost device may not be capable of. In this can, the values of the parameters in the preventive and/or fallback mechanism adapted accordingly.
- Operational scenarios; e.g. UEs operating under good SNR conditions or in extended coverage.
- Service type (or traffic pattern); e.g. based on latency, reliability that are required by the service of this particular UE. For example for services that require low latency, the network node may not configure the fallback mechanism or if configured, it may use a certain parameter values, e.g. for value of T0.

Type of LBT; when using a certain type of LBT category there is also a higher likelihood for LBT failure and vice versa. For example, when there is higher probability of LBT failure, then the network node can use a different set of values for the parameters in preventive mechanism. On the other hand, channel is expected to be easier to access using a certain type of LBT, then network can use smaller values for the parameters in the preventive mechanism. Similar adaptation can also be made for the fallback mechanism.

DRX cycle; for example if the UE is configured with a certain DRX cycles that allows it to sleep for long time duration, then it is more important that when it is active transmission/receptions work properly otherwise the it has to wait for long duration before it try receiving/transmitting next time.

In the determination process, the network node takes into account any one or more of the criteria listed above. The parameters in the preventive mechanism and/or fallback mechanism are adapted based on e.g. criticality of the service type, operational scenario, type of LBT, type of device etc.

Figure 8:
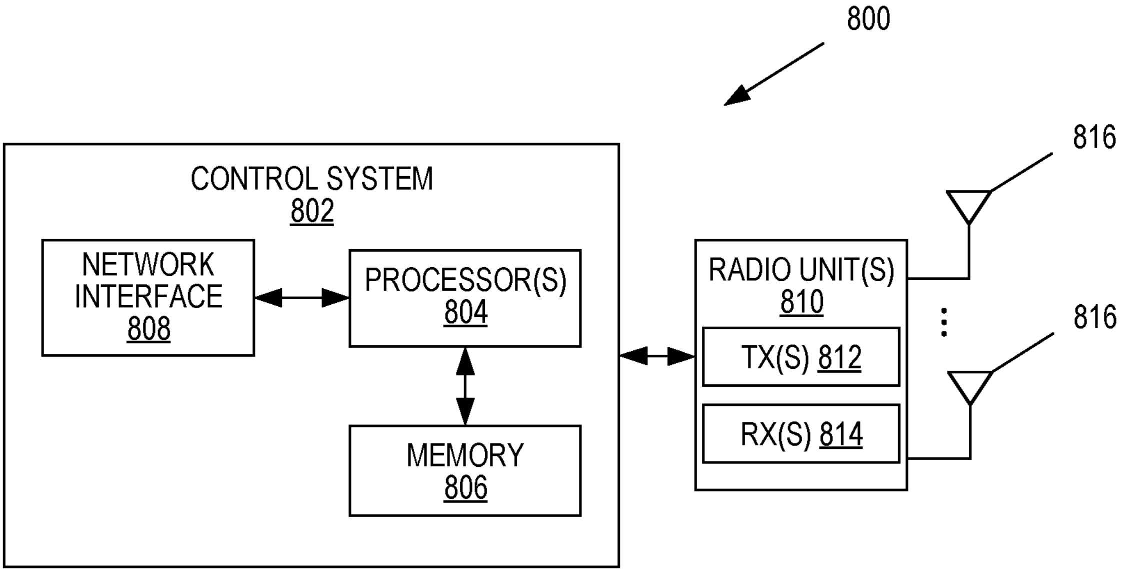
FIGS. 8 through 10 are schematic block diagrams of example embodiments of a base station.

The determined information (sometimes also called configurations) are configured to the UE. Such configuration can be made using, e.g., dedicated signaling in RRC_CONNECTED state or using any broadcast signaling FIG. 8 is a schematic block diagram of a radio access node 800 according to some embodiments of the present disclosure. The radio access node 800 may be, for example, a base station 202 or 206. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
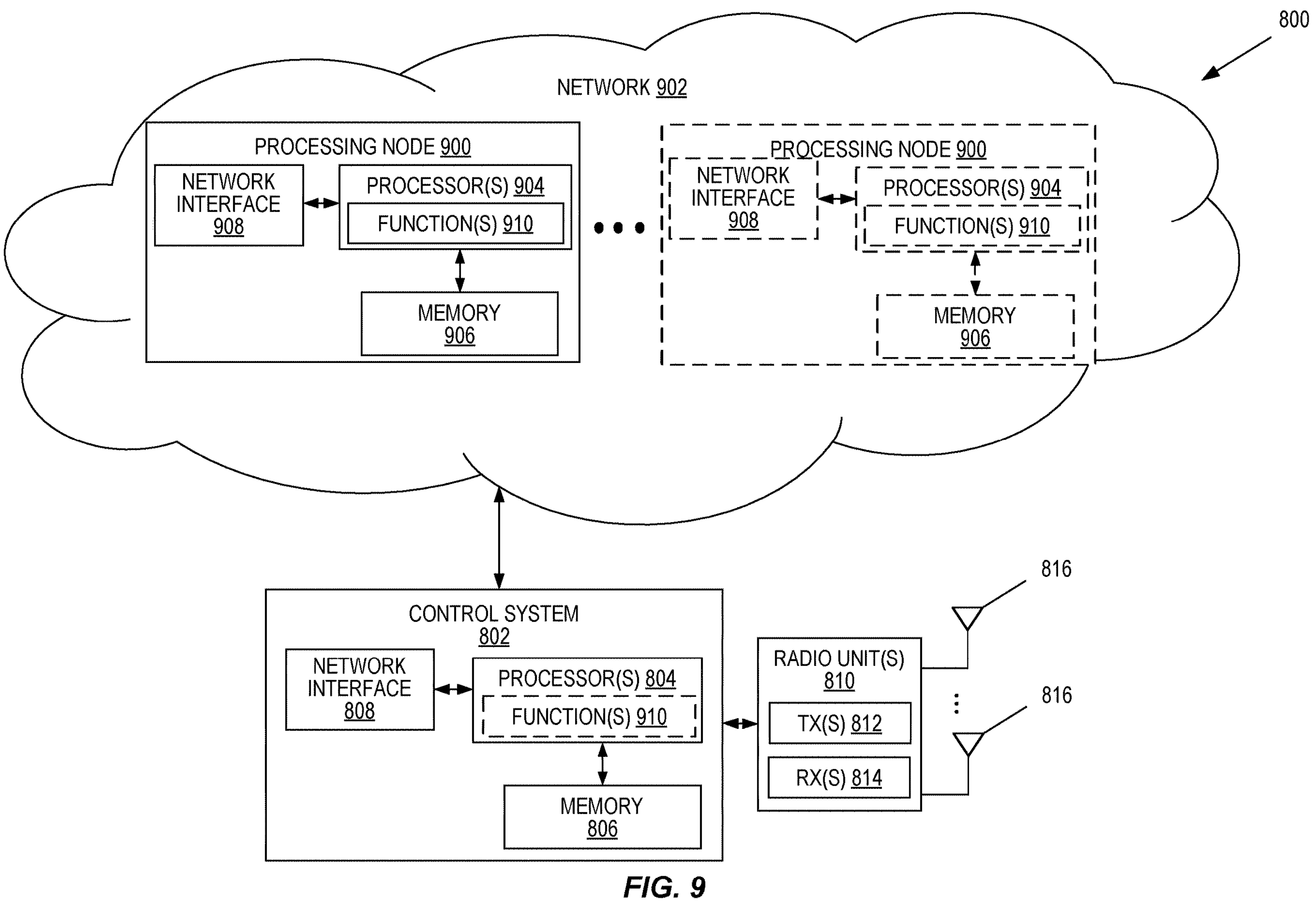

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes the control system 802 that includes the one or more processors 804 (e.g., CPUs, ASICs, FPGAs, and/or the like), the memory 806, and the network interface 808 and the one or more radio units 810 that each includes the one or more transmitters 812 and the one or more receivers 814 coupled to the one or more antennas 816, as described above. The control system 802 is connected to the radio unit(s) 810 via, for example, an optical cable or the like. The control system 802 is connected to one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
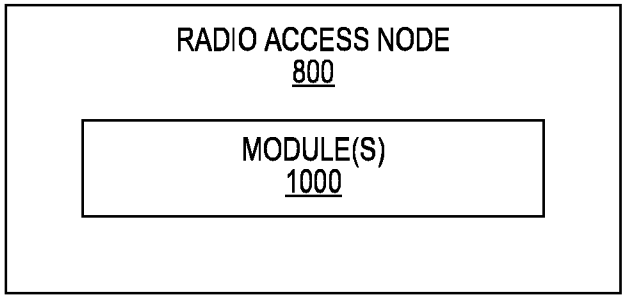

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
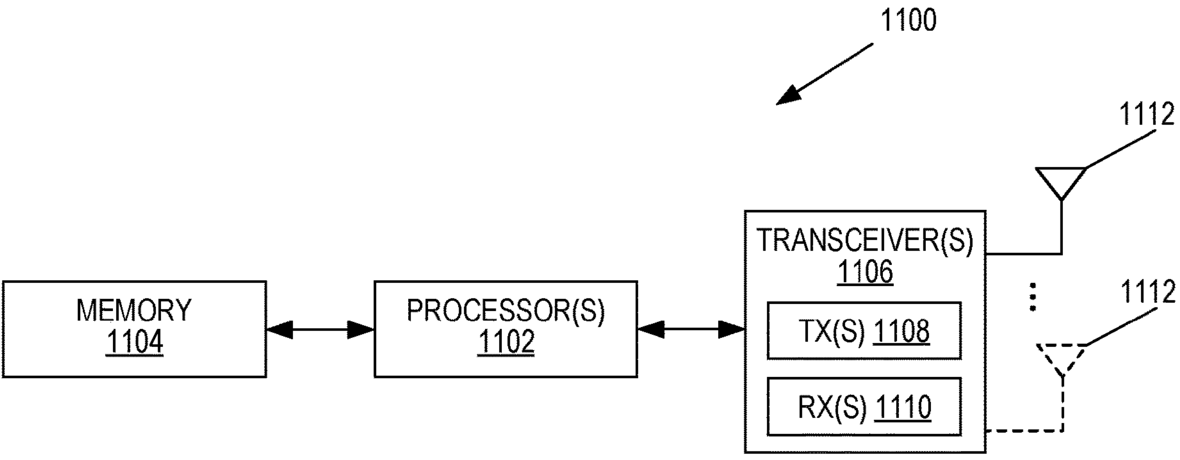
FIGS. 11 and 12 are schematic block diagrams of example embodiments of a UE.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the UE 1100 described above may be fully or partially implemented in software that is, e.g., stored in the memory 1104 and executed by the processor(s) 1102.

Note that the UE 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the UE 1100 and/or allowing output of information from the UE 1100), a power supply (e.g., a battery and associated power circuitry), etc.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
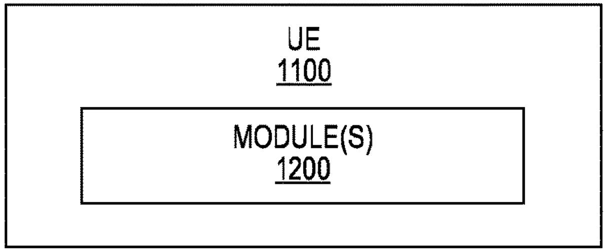

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a wireless device for cell change, the method comprising: obtaining (300) one or more cell change configurations; and performing (302) a cell change procedure based on the one or more cell change configurations.

Embodiment 2: The method of embodiment 1 wherein the one or more cell change configurations are related to CCA failures from a serving network node.

Embodiment 3: The method of embodiment 1 or 2 wherein performing (302) the cell change procedure based on the one or more cell change configurations comprises adapting one or more measurement procedures based on the one or more cell change configurations.

Embodiment 4: The method of any one of embodiments 1 to 3 wherein the one or more cell change configurations comprising either or both of: (a) one or more preventative parameters related to prevention of failure of a cell change procedure to a target cell in unlicensed spectrum; and (b) one or more fallback parameters related to one or more fallback procedures to be performed by the wireless device in event of failure of a cell change procedure to a target cell in unlicensed spectrum.

Embodiment 5: The method of any one of embodiments 1 to 4 wherein the one or more cell change configurations comprise a defined number of cell change attempts.

Embodiment 6: The method of any one of embodiments 1 to 4 wherein the one or more cell change configurations comprise a maximum number of cell change attempts allowed to be performed by the wireless device before a failure of the cell change procedure is declared by the wireless device.

Embodiment 7: The method of any one of embodiments 1 to 6 wherein the one or more cell change configurations comprise a maximum duration of time for cell change attempts.

Embodiment 8: The method of any one of embodiments 1 to 6 wherein the one or more cell change configurations comprise a maximum duration of time that the cell change procedure can be attempted without success before a failure of the cell change procedure is declared by the wireless device.

Embodiment 9: The method of any one of embodiments 1 to 8 wherein the one or more cell change configurations comprise one or more configurations related to one or more fallback procedures to be performed by the wireless device in event of failure of a cell change procedure to a target cell in unlicensed spectrum.

Embodiment 10: The method of any one of embodiments 1 to 9 wherein one or more cell change configurations comprise one or more cell change configurations for each of two or more stages of the cell change procedure.

Embodiment 11: The method of embodiment 10 wherein, for each stage of the two or more stages of the cell change procedure, the one or more cell change configurations comprise any one of, any combination of, or all of the following parameters:

- a maximum number of allowed missed occasions containing a particular signal type(s) in the stage (e.g., due to CCA failure) after which the wireless device declares a failure at the stage of the cell change procedure;
- a maximum duration of time during the stage over which the wireless device may miss occasions containing a particular signal type(s) (e.g., due to CCA failure) after which the wireless device declares a failure at the stage of the cell change procedure; and
- a maximum duration of time during the stage after which the wireless device declares a failure at the stage of the cell change procedure provided that during this maximum duration of time the wireless device has missed at least a certain number of occasions containing a particular signal type(s) (e.g., due to CCA failure).

Embodiment 12: The method of embodiment 10 wherein, for each stage of the two or more stages of the cell change procedure, the one or more cell change configurations comprise any one of, any combination of, or all of the following:

- information about a set of fallback target cells (e.g., cell3) in case the wireless device is unable to successfully perform cell change to a desired target cell (e.g., cell2);

one or more signal margins to be used by the wireless device for performing cell change to another cell after failing to perform cell change to a desired target cell (e.g., cell2); and one or more operating parameters (e.g., duration) for enabling operation on a new cell (e.g., cell3) after performing cell change to the new cell.

Embodiment 13: The method of any one of embodiments 1 to 12 wherein the one or more cell change configurations comprise, for a first stage of a cell change procedure: (a) one or more preventative parameters for the first stage of the cell change procedure related to prevention of failure of the cell change procedure to a target cell in unlicensed spectrum during the first stage of the cell change procedure; and (b) one or more fallback parameters for the first stage of the cell change procedure related to one or more fallback procedures to be performed by the wireless device in event of failure of the cell change procedure to a target cell in unlicensed spectrum for the first stage of the cell change procedure.

Embodiment 14: The method of embodiment 13 wherein the first stage of the cell change procedure is a cell evaluation stage of the cell change procedure.

Embodiment 15: The method of any one of embodiments 1 to 14 wherein the one or more cell change configurations comprise, for a second stage of the cell change procedure: (a) one or more preventative parameters for the second stage of the cell change procedure related to prevention of failure of the cell change procedure to a target cell in unlicensed spectrum during the second stage of the cell change procedure; and (b) one or more fallback parameters for the second stage of the cell change procedure related to one or more fallback procedures to be performed by the wireless device in event of failure of the cell change procedure to a target cell in unlicensed spectrum for the second stage of the cell change procedure.

Embodiment 16: The method of embodiment 15 wherein the second stage of the cell change procedure is a system information acquisition stage of the cell change procedure.

Embodiment 17: The method of any one of embodiments 1 to 16 wherein the one or more cell change configurations comprise, for a third stage of the cell change procedure: (a) one or more preventative parameters for the third stage of the cell change procedure related to prevention of failure of the cell change procedure to a target cell in unlicensed spectrum during the third stage of the cell change procedure; and (b) one or more fallback parameters for the third stage of the cell change procedure related to one or more fallback procedures to be performed by the wireless device in event of failure of the cell change procedure to a target cell in unlicensed spectrum for the third stage of the cell change procedure.

Embodiment 18: The method of embodiment 17 wherein the third stage of the cell change procedure is an update stage of the cell change procedure in which an update(s) are provided to the target cell for the cell change procedure.

Embodiment 19: The method of any one of embodiments 12 to 18 wherein either or both of (a) and (b) are different for one stage of the cell change procedure than they are for at least one other stage of the cell change procedure.

Embodiment 20: The method of any one of embodiments 12 to 18 wherein either or both of (a) and (b) are the same for one stage of the cell change procedure as they are for at least one other stage of the cell change procedure.

Embodiment 21: The method of any one of embodiments 1 to 20 wherein the one or more cell change configurations comprise one or more configurations related to a fallback procedure in which the UE is allowed to enter a relaxed operational mode to access a fallback cell (cell3) with a relaxed cell change margin.

Embodiment 22: A method performed by a network node (e.g., a base station) comprising: determining (700) one or more cell change configurations; and providing (702) the one or more cell change configurations to a wireless device.

Embodiment 23: The method of embodiment 23 wherein the one or more cell change configurations comprising either or both of: (a) one or more preventative parameters related to prevention of failure of a cell change procedure to a target cell in unlicensed spectrum; and (b) one or more fallback parameters related to one or more fallback procedures to be performed by the wireless device in event of failure of a cell change procedure to a target cell in unlicensed spectrum.

Embodiment 24: The method of embodiment 22 or 23 wherein the one or more cell change configurations comprise a defined number of cell change attempts.

Embodiment 25: The method of embodiment 22 or 23 wherein the one or more cell change configurations comprise a maximum number of cell change attempts allowed to be performed by the wireless device before a failure of the cell change procedure is declared by the wireless device.

Embodiment 26: The method of any one of embodiments 22 to 25 wherein the one or more cell change configurations comprise a maximum duration of time for cell change attempts.

Embodiment 27: The method of any one of embodiments 22 to 25 wherein the one or more cell change configurations comprise a maximum duration of time that the cell change procedure can be attempted without success before a failure of the cell change procedure is declared by the wireless device.

Embodiment 28: The method of any one of embodiments 22 to 27 wherein the one or more cell change configurations comprise one or more configurations related to one or more fallback procedures to be performed by the wireless device in event of failure of a cell change procedure to a target cell in unlicensed spectrum.

Embodiment 29: The method of any one of embodiments 22 to 28 wherein one or more cell change configurations comprise one or more cell change configurations for each of two or more stages of the cell change procedure.

Embodiment 30: The method of embodiment 29 wherein, for each stage of the two or more stages of the cell change procedure, the one or more cell change configurations comprise any one of, any combination of, or all of the following parameters:

a maximum number of allowed missed occasions containing a particular signal type(s) in the stage (e.g., due to CCA failure) after which the wireless device declares a failure at the stage of the cell change procedure;

a maximum duration of time during the stage over which the wireless device may miss occasions containing a particular signal type(s) (e.g., due to CCA failure) after which the wireless device declares a failure at the stage of the cell change procedure; and ma maximum duration of time during the stage after which the wireless device declares a failure at the stage of the cell change procedure provided that during this maximum duration of time the wireless device has missed at least a certain number of occasions containing a particular signal type(s) (e.g., due to CCA failure).

Embodiment 31: The method of embodiment 29 wherein, for each stage of the two or more stages of the cell change procedure, the one or more cell change configurations comprise any one of, any combination of, or all of the following:

information about a set of fallback target cells (e.g., cell3) in case the wireless device is unable to successfully perform cell change to a desired target cell (e.g., cell2);

one or more signal margins to be used by the wireless device for performing cell change to another cell after failing to perform cell change to a desired target cell (e.g., cell2); and one or more operating parameters (e.g., duration) for enabling operation on a new cell (e.g., cell3) after performing cell change to the new cell.

Embodiment 32: The method of any one of embodiments 22 to 31 wherein the one or more cell change configurations comprise, for a first stage of a cell change procedure: (a) one or more preventative parameters for the first stage of the cell change procedure related to prevention of failure of the cell change procedure to a target cell in unlicensed spectrum during the first stage of the cell change procedure; and (b) one or more fallback parameters for the first stage of the cell change procedure related to one or more fallback procedures to be performed by the wireless device in event of failure of the cell change procedure to a target cell in unlicensed spectrum for the first stage of the cell change procedure.

Embodiment 33: The method of embodiment 32 wherein the first stage of the cell change procedure is a cell evaluation stage of the cell change procedure.

Embodiment 34: The method of any one of embodiments 22 to 33 wherein the one or more cell change configurations comprise, for a second stage of the cell change procedure: (a) one or more preventative parameters for the second stage of the cell change procedure related to prevention of failure of the cell change procedure to a target cell in unlicensed spectrum during the second stage of the cell change procedure; and (b) one or more fallback parameters for the second stage of the cell change procedure related to one or more fallback procedures to be performed by the wireless device in event of failure of the cell change procedure to a target cell in unlicensed spectrum for the second stage of the cell change procedure.

Embodiment 35: The method of embodiment 34 wherein the second stage of the cell change procedure is a system information acquisition stage of the cell change procedure.

Embodiment 36: The method of any one of embodiments 22 to 35 wherein the one or more cell change configurations comprise, for a third stage of the cell change procedure: (a) one or more preventative parameters for the third stage of the cell change procedure related to prevention of failure of the cell change procedure to a target cell in unlicensed spectrum during the third stage of the cell change procedure; and (b) one or more fallback parameters for the third stage of the cell change procedure related to one or more fallback procedures to be performed by the wireless device in event of failure of the cell change procedure to a target cell in unlicensed spectrum for the third stage of the cell change procedure.

Embodiment 37: The method of embodiment 36 wherein the third stage of the cell change procedure is an update stage of the cell change procedure in which an update(s) are provided to the target cell for the cell change procedure.

Embodiment 38: The method of any one of embodiments 31 to 37 wherein either or both of (a) and (b) are different for one stage of the cell change procedure than they are for at least one other stage of the cell change procedure.

Embodiment 39: The method of any one of embodiments 32 to 38 wherein either or both of (a) and (b) are the same for one stage of the cell change procedure as they are for at least one other stage of the cell change procedure.

Embodiment 40: The method of any one of embodiments 22 to 39 wherein the one or more cell change configurations comprise one or more configurations related to a fallback procedure in which the UE is allowed to enter a relaxed operational mode to access a fallback cell (cell3) with a relaxed cell change margin.

Embodiment 41: A wireless device comprising processing circuitry configured to perform any of the steps of any of embodiments 1 to 21 and power supply circuitry configured to supply power to the wireless device.

Embodiment 42: A base station comprising processing circuitry configured to perform any of the steps of any of embodiments 22 to 40 and power supply circuitry configured to supply power to the base station.

Embodiment 43: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of embodiments 1 to 21; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Those skilled in the art will recognize improvements and modifications to the embodiments of the present disclosure. All such improvements and modifications are considered within the scope of the concepts disclosed herein.

The invention claimed is:

1. A method performed by a wireless device for cell change to a cell subject to Clear Channel Assessment (CCA), the method comprising:

obtaining one or more cell change configurations that are related to CCA failures when performing the cell change to a target cell subject to CCA; and performing the cell change to a desired target cell subject to CCA, wherein:

performing the cell change comprises performing the cell change based on the one or more cell change configurations, and the one or more cell change configurations comprise one or more fallback parameters related to one or more fallback procedures to be performed by the wireless device in event of failure of the cell change to the target cell subject to CCA, the one or more cell change configurations comprise one or more cell change configurations for each of two or more stages of the cell change, the one or more cell change configurations comprise one or more preventative parameters related to prevention of the failure of the cell change to the target cell subject to CCA, the one or more cell change configurations comprise one or more parameters that prolong a duration of time over which a UE is allowed to attempt to obtain system information of the target cell, and the one or more cell change configurations comprise a maximum number of cell change attempts allowed to be performed by the wireless device before a failure of the cell change is declared by the wireless device.

2. The method of claim 1, wherein the one or more cell change configurations comprise information about a set of fallback target cells for a fallback procedure in case the wireless device does not successfully perform the cell change to the target cell subject to CCA.

3. The method of claim 1, wherein the one or more cell change configurations comprise information that defines that the wireless device is allowed to attempt cell change a number (N) of times.

4. The method of claim 1, wherein, for at least one stage of two or more stages of the cell change, the one or more cell change configurations comprise a maximum number of allowed missed occasions containing a particular signal type in the stage due to CCA failure after which the wireless device declares a failure at the stage of the cell change.

5. The method of claim 1, wherein the cell change is a cell reselection, a Radio Resource Control (RRC) connection release with redirection, a RRC re-establishment, or a RRC resume.

6. The method of claim 1, wherein the cell subject to CCA comprises a cell that operates on or belongs to one or more of: a carrier subject to CCA, shared spectrum, spectrum subject to a CCA procedure, spectrum subject to a listen before talk (LBT), and spectrum for contention based operation.

7. A wireless device for cell change to a cell subject to Clear Channel Assessment (CCA), the wireless device comprising:

one or more transmitters;

one or more receivers; and processing circuitry associated with the one or more transmitters and the one or more receivers, the processing circuitry configured to cause the wireless device to:

obtain one or more cell change configurations that are related to CCA failures when performing a cell change to a target cell subject to CCA; and perform a cell change to a desired target cell subject to CCA, wherein:

performing the cell change comprises performing the cell change based on the one or more cell change configurations, and the one or more cell change configurations comprise one or more fallback parameters related to one or more fallback procedures to be performed by the wireless device in event of failure of the cell change to the target cell subject to CCA, the one or more cell change configurations comprise one or more cell change configurations for each of two or more stages of the cell change, the one or more cell change configurations comprise one or more preventative parameters related to prevention of the failure of the cell change to the target cell subject to CCA, the one or more cell change configurations comprise one or more parameters that prolong a duration of time over which a UE is allowed to attempt to obtain system information of the target cell, and the one or more cell change configurations comprise a maximum number of cell change attempts allowed to be performed by the wireless device before a failure of the cell change is declared by the wireless device.

8. A method performed by a network node for a cellular communications network, the method comprising:

determining one or more cell change configurations that are related to Clear Channel Assessment (CCA) failures when one or more wireless devices are performing a cell change to a target cell subject to CCA; and providing the one or more cell change configurations to a wireless device, wherein the one or more cell change configurations comprising:

one or more fallback parameters related to one or more fallback procedures to be performed by the wireless device in event of failure of the cell change to the target cell subject to CCA, one or more cell change configurations for each of two or more stages of the cell change, the one or more cell change configurations comprise one or more preventative parameters related to prevention of the failure of the cell change to the target cell subject to CCA, the one or more cell change configurations comprise one or more parameters that prolong a duration of time over which a UE is allowed to attempt to obtain system information of the target cell, and a maximum number of cell change attempts allowed to be performed by the wireless device before a failure of the cell change is declared by the wireless device.

9. The method of claim 8, wherein the one or more cell change configurations comprise a defined number of cell change attempts.

10. The method of claim 8, wherein the one or more cell change configurations comprise one or more configurations related to one or more fallback procedures to be performed by the wireless device in event of failure of the cell change to the target cell subject to CCA.

11. The method of claim 8, wherein, for at least one stage of two or more stages of the cell change, the one or more cell change configurations comprise any one of, any combination of, or all of the following parameters:

a maximum number of allowed missed occasions containing a particular signal type(s) in a stage of the cell change due to CCA failure after which the wireless device declares a failure at the stage of the cell change;

a maximum duration of time during the stage of the cell change over which the wireless device may miss occasions containing a particular signal type(s) due to the CCA failure after which the wireless device declares a failure at the stage of the cell change; and a maximum duration of time during the stage after which the wireless device declares a failure at the stage of the cell change provided that during this maximum duration of time the wireless device has missed at least a certain number of occasions containing a particular signal type(s) due to the CCA failure.

12. The method of claim 8, wherein the one or more cell change configurations comprise any one of, any combination of, or all of the following:

information about a set of fallback target cells in case the wireless device is unable to successfully perform cell change to a desired target cell;

one or more signal margins to be used by the wireless device for performing cell change to another cell after failing to perform the cell change to the desired target cell; and one or more operating parameters for enabling operation on a new cell after performing the cell change to the new cell.

13. The method of claim 8, wherein the target cell subject to CCA comprises a cell that operates on or belongs to one or more of: a carrier subject to CCA, shared spectrum, spectrum subject to a CCA procedure, spectrum subject to a listen before talk (LBT) and spectrum for contention based operation.

14. A network node for a cellular communications network, the network node comprising processing circuitry configured to cause the network node to:

determine one or more cell change configurations that are related to Clear Channel Assessment (CCA) failures when one or more wireless devices are performing a cell change to a target cell subject to CCA; and provide the one or more cell change configurations to a wireless device, wherein the one or more cell change configurations comprising:

one or more fallback parameters related to one or more fallback procedures to be performed by the wireless device in event of failure of the cell change to the target cell subject to CCA, one or more cell change configurations for each of two or more stages of the cell change, the one or more cell change configurations comprise one or more preventative parameters related to prevention of the failure of the cell change to the target cell subject to CCA, the one or more cell change configurations comprise one or more parameters that prolong a duration of time over which a UE is allowed to attempt to obtain system information of the target cell, and a maximum number of cell change attempts allowed to be performed by the wireless device before a failure of the cell change is declared by the wireless device.

* * * * *